US012047785B2

(12) United States Patent
Salahuddeen et al.

(10) Patent No.: US 12,047,785 B2
(45) Date of Patent: Jul. 23, 2024

(54) MANAGEMENT PLANE FUNCTIONALITY FOR SWITCHED NETWORK SHARED CELL CONFIGURATION OF OPEN RADIO ACCESS NETWORK (O-RAN) SYSTEM

(71) Applicant: CommScope Technologies LLC, Hickory, NC (US)

(72) Inventors: Irfaan Ahamed Salahuddeen, Acton, MA (US); Balaji B Raghothaman, Chester Springs, PA (US); Calogero Armao, Saronno (IT)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 17/469,527

(22) Filed: Sep. 8, 2021

(65) Prior Publication Data

US 2022/0078631 A1 Mar. 10, 2022

Related U.S. Application Data

(60) Provisional application No. 63/132,261, filed on Dec. 30, 2020.

(30) Foreign Application Priority Data

Sep. 9, 2020 (IT) .................. 102020000021388

(51) Int. Cl.
*H04W 16/18* (2009.01)
*H04L 12/761* (2013.01)
(Continued)

(52) U.S. Cl.
CPC ............. *H04W 16/18* (2013.01); *H04L 45/16* (2013.01); *H04W 84/045* (2013.01)

(58) Field of Classification Search
None
See application file for complete search history.

(56) References Cited

U.S. PATENT DOCUMENTS 9,125,054 B2 9/2015 Ryan
11,088,930 B2 8/2021 Ruffini et al.
(Continued)

FOREIGN PATENT DOCUMENTS

WO 2015070421 A1 5/2015

OTHER PUBLICATIONS

International Searching Authority, "International Search Report and Written Opinion from PCT Application No. PCT/US2021/049454 dated Jan. 31, 2022", from Foreign Counterpart to U.S. Appl. No. 17/469,527, pp. 1 through 21, Published in: EP.
(Continued)

*Primary Examiner* — Hong Shao
(74) *Attorney, Agent, or Firm* — Fogg & Powers LLC

(57) ABSTRACT

One embodiment is directed to a system comprising a distributed unit (DU) and a plurality of remote units (RUs) to wirelessly transmit and receive radio frequency signals to and from the user equipment using a wireless interface. The DU and RUs are communicatively coupled to each other over a fronthaul and are configured to communicate over the fronthaul using an O-RAN fronthaul interface. Management-plane functionality in the system is configured to define a respective transport flow for one or more processing elements using an RU interface that specifies one or more multicast addresses in order to support multicast transmission from the DU to multiple RUs. In another embodiment, each RU is configured to advertise, during a capability discovery process, capabilities related to implementing a switched network shared cell configuration.

30 Claims, 20 Drawing Sheets

(51) Int. Cl.
*H04L 45/16* (2022.01)
*H04W 84/04* (2009.01)

(56) References Cited

U.S. PATENT DOCUMENTS

| | | | |
|---|---|---|---|
| 2017/0164336 A1 | 6/2017 | Boldi et al. | |
| 2018/0234875 A1 | 8/2018 | Leroudier | |
| 2019/0273518 A1 | 9/2019 | Wang et al. | |
| 2020/0092881 A1* | 3/2020 | Nezou | H04W 72/0413 |
| 2021/0243797 A1* | 8/2021 | Reddy | H04L 27/2671 |
| 2021/0385686 A1* | 12/2021 | Ahmed | H04W 72/04 |
| 2022/0014236 A1 | 1/2022 | Kosugi et al. | |
| 2022/0201796 A1* | 6/2022 | Nakata | H04W 88/085 |

OTHER PUBLICATIONS

International Searching Authority, "Invitation to Pay Additional Fees from PCT Application No. PCT/US2020/049454 dated Dec. 10, 2021", from Foreign Counterpart to U.S. Appl. No. 17/469,527, pp. 117, Published: EP.

Ministry of Economic Development, "Search Report from IT Application No. 102021000029054", dated Jul. 4, 2022, pp. 1 through 10, Published: IT.

O-RAN Alliance Working Group 4: "O-RAN Alliance Working Group 4; Management Plane Specification", O-RAN.WG4.MP.0-V04.00. Technical Specification, O-RAN, US, Jul. 1, 2020, pp. 1 through 183, Retrieved from the Internet:URL:https://www.orandownloadsweb.azurewebsites.net/specifications.

O-RAN Fronthaul Working Group, "Control, User and Synchronization Plane Specification", Technical Specification—O-RAN.WG4.CUS.0-v03.00—O-RAN Fronhaul Working Group: Control, User and Synchronization Plane Specification, O-RAN, vol. O-RAN.WG4.CUS.0-v03.00, Apr. 1, 2020, pp. 1 through 253, Retrieved from the Internet:URL:https://www.o-ran.org/specifications.

Ministry of Economic Development, "Search Report from IT Application No. 102020000021388", dated May 19, 2021, pp. 1 through 16, Published: IT.

* cited by examiner

MANAGEMENT PLANE FUNCTIONALITY FOR SWITCHED NETWORK SHARED CELL CONFIGURATION OF OPEN RADIO ACCESS NETWORK (O-RAN) SYSTEM

CROSS-REFERENCE TO RELATED APPLICATIONS

This application claims the benefit of Italian Patent Application No. 102020000021388, filed on Sep. 9, 2020, which is hereby incorporated herein by reference in its entirety, and claims the benefit of U.S. Provisional Patent Application Ser. No. 63/132,261, filed on Dec. 30, 2020, which is hereby incorporated herein by reference in its entirety.

BACKGROUND

The O-RAN Alliance has published specifications defining an architecture for implementing next generation RAN infrastructures. "O-RAN" refers to an open radio access network (RAN). The O-RAN architecture employs a distributed unit (DU) (also referred to as an "O-RAN DU" or "O-DU") and a remote unit (RU) (also referred to as an "O-RAN RU" or "O-RU"). Each DU implements the Layer 2 and upper Layer 1 functions for the wireless interface used to wirelessly communicate with user equipment (UE), and each RU implements the lower Layer 1 functions for that wireless interface. Each DU is coupled to each RU over a fronthaul link (for example, implemented using a switched Ethernet network).

The O-RAN Alliance has published specifications defining an open fronthaul interface for communications between the DU and RU over the fronthaul. For example, the O-RAN Fronthaul Working Group (Working Group 4) has produced a "Control, User and Synchronization Plane Specification" that specifies the functional split that is to be used between the functions implemented in the DU and the functions implemented in the RU. This O-RAN fronthaul specification specifies that a so-called "7-2x" functional split be used, with two variants that differ in where the precoding function is implemented.

FIG. 1 illustrates the 7-2x functional split used for the downlink where the precoding function is implemented in the DU 104. As shown in FIG. 1, the precoding function 102 for the wireless interface is implemented in the DU 104, whereas the beamforming function 106 is implemented in the RU 108. As noted above, the DU 104 and RU 108 communicate with each other over the O-RAN fronthaul 110. The variant of the 7-2x functional split shown in FIG. 1 is also referred to as the "Category A" 7-2x functional split, and an RU 108 that supports the Category A 7-2x functional split is also referred to as a "Category A" RU 108.

FIG. 2 illustrates the 7-2x functional split used for the downlink where the precoding function is implemented in the RU 108. As shown in FIG. 2, both the precoding function 202 and the beamforming function 206 for the wireless interface is implemented in the RU 208. As noted above, the DU 204 and RU 208 communicate with each other over the O-RAN fronthaul 210. The variant of the 7-2x functional split shown in FIG. 2 is also referred to as the "Category B" 7-2x functional split, and a RU 208 that supports the Category B 7-2x functional split is also referred to as a "Category B" RU 208.

SUMMARY

One embodiment is directed to a system that comprises a distributed unit (DU) to communicatively couple to a core network. The DU is configured to implement at least some LAYER 2 functions for a wireless interface and at least some LAYER 1 functions for the wireless interface. The system further comprises a plurality of remote units (RUs) to wirelessly transmit and receive radio frequency signals to and from the user equipment using the wireless interface. Each of the RUs is associated with at least one antenna and located remote from the DU and at least one other RU. Each RU is configured to implement the LAYER 1 functions for the wireless interface that are not implemented in the DU. The DU and RUs are communicatively coupled to each other over a fronthaul and are configured to communicate over the fronthaul using an O-RAN fronthaul interface. Management-plane functionality in the system is configured to define a respective transport flow for one or more processing elements using an RU interface that specifies one or more multicast addresses in order to support multicast transmission from the DU to multiple RUs.

Another embodiment is directed to a system that comprises a distributed unit (DU) to communicatively couple to a core network. The DU is configured to implement at least some LAYER 2 functions for a wireless interface and at least some LAYER 1 functions for the wireless interface. The system further comprises a plurality of remote units (RUs) to wirelessly transmit and receive radio frequency signals to and from the user equipment using the wireless interface. Each of the RUs is associated with at least one antenna and located remote from the DU and at least one other RU. Each RU is configured to implement the LAYER 1 functions for the wireless interface that are not implemented in the DU. The DU and RUs are communicatively coupled to each other over a fronthaul and are configured to communicate over the fronthaul using an O-RAN fronthaul interface. Each RU is configured to advertise, during a capability discovery process, capabilities related to implementing a switched network shared cell configuration.

The details of various embodiments are set forth in the accompanying drawings and the description below. Other features and advantages will become apparent from the description, the drawings, and the claims.

DRAWINGS

Figure 11:
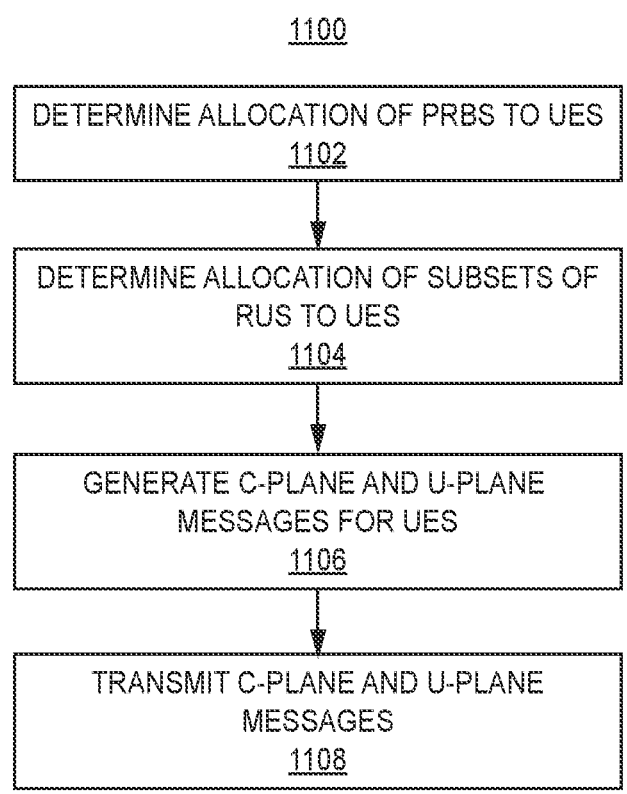

FIG. 11 comprises a high-level flowchart illustrating one exemplary embodiment of a method of generating and transmitting C-plane and U-plane messages that include the new section extension described here.

Figure 12A:
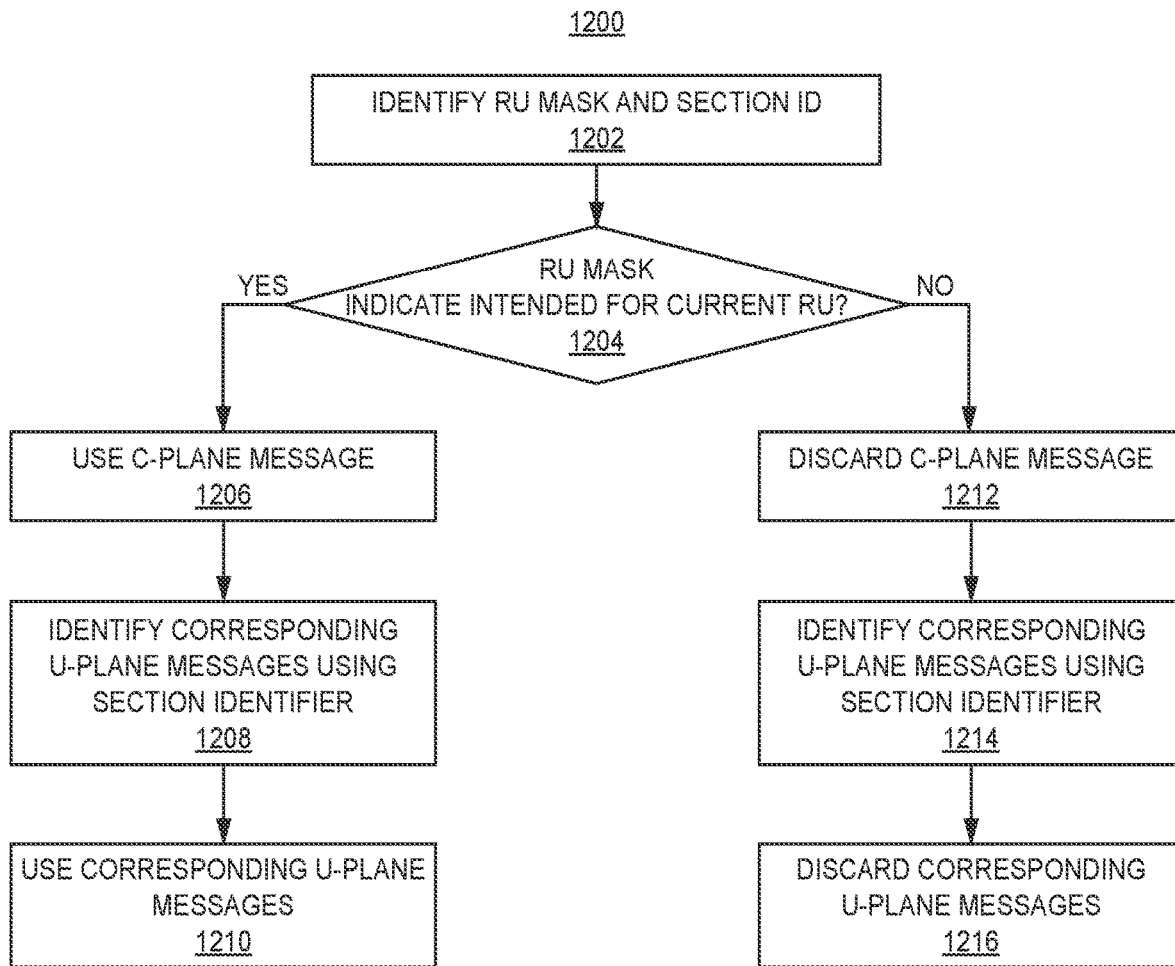

FIG. 12A comprises a high-level flowchart illustrating one exemplary embodiment of a method of receiving and processing downlink C-plane and U-plane messages that include the new section extensions.

Figure 12B:
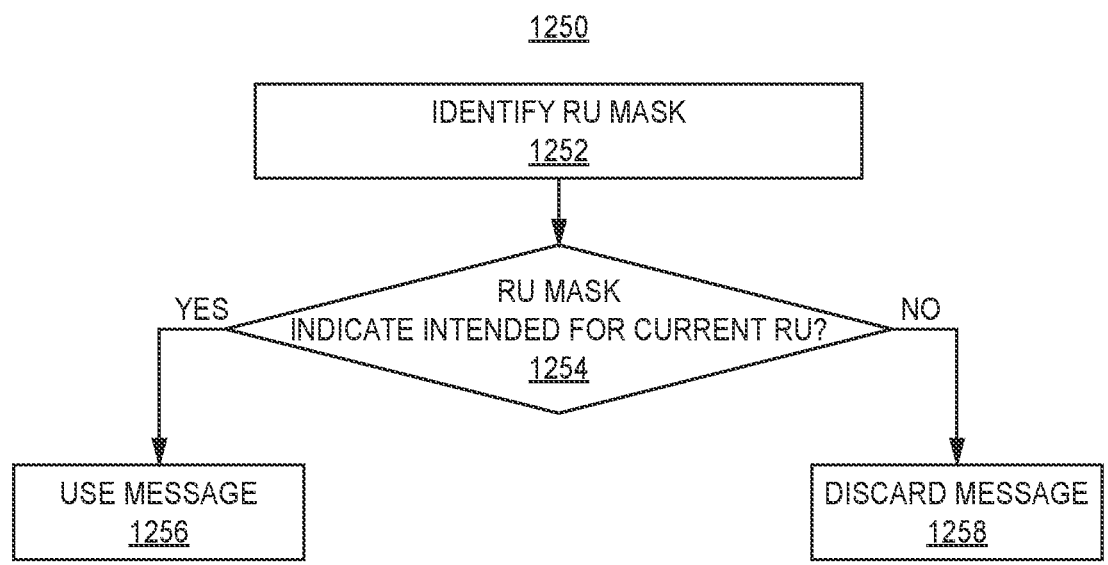

FIG. 12B comprises a high-level flowchart illustrating another exemplary embodiment of a method of receiving and processing downlink C-plane and U-plane messages that include new section extensions.

Figure 5A:
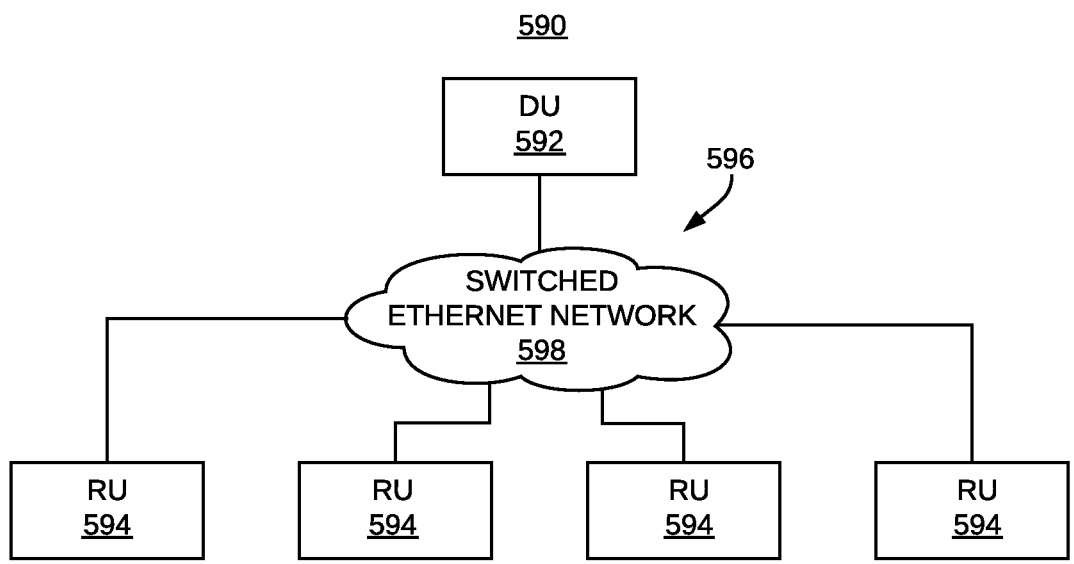
FIG. 5A illustrates a switched network shared cell configuration.
Figure 5B:
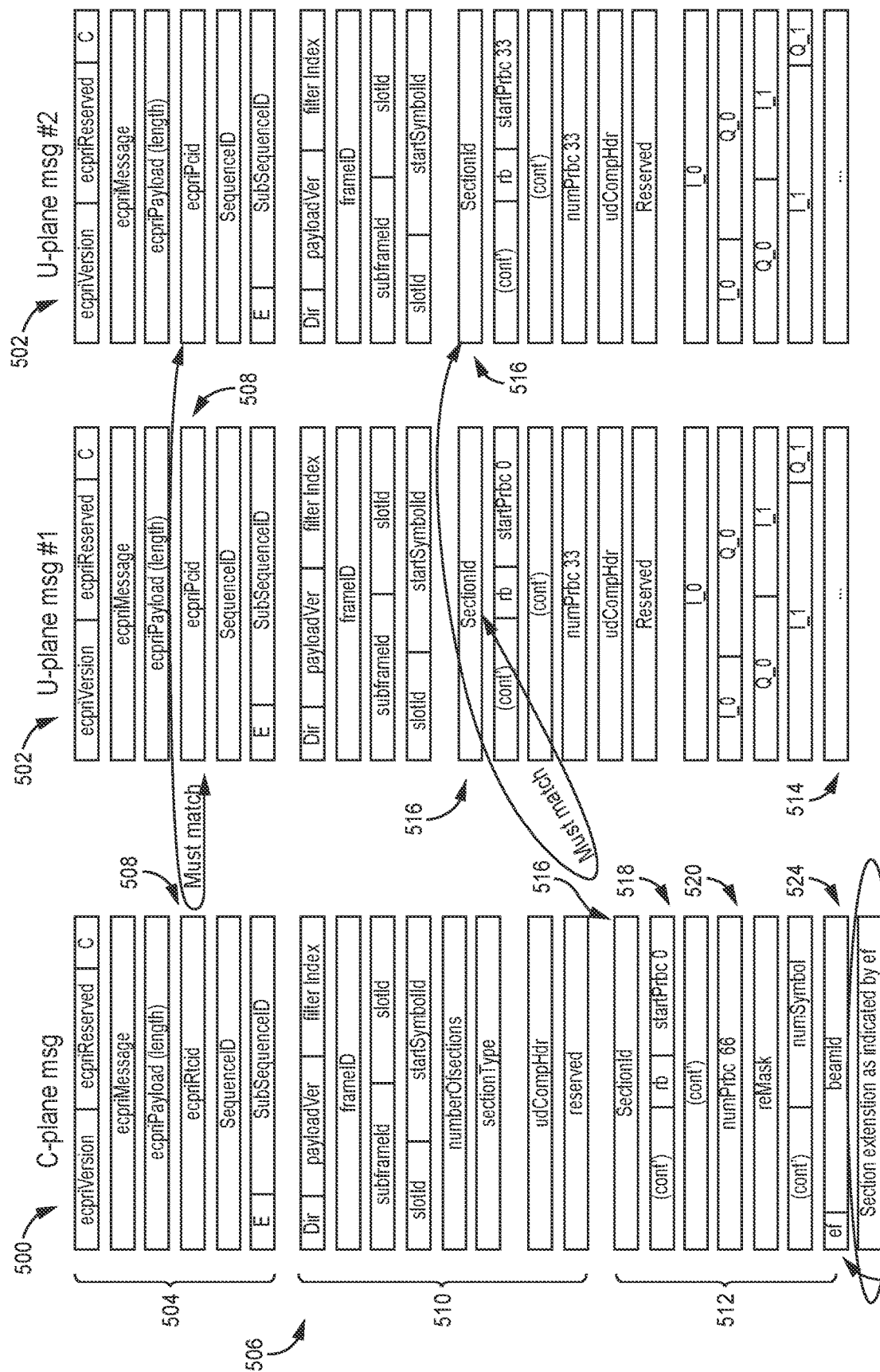
FIG. 5 illustrates one example of a C-plane message for a section of user data that is fragmented into multiple U-plane messages.
Figure 6:
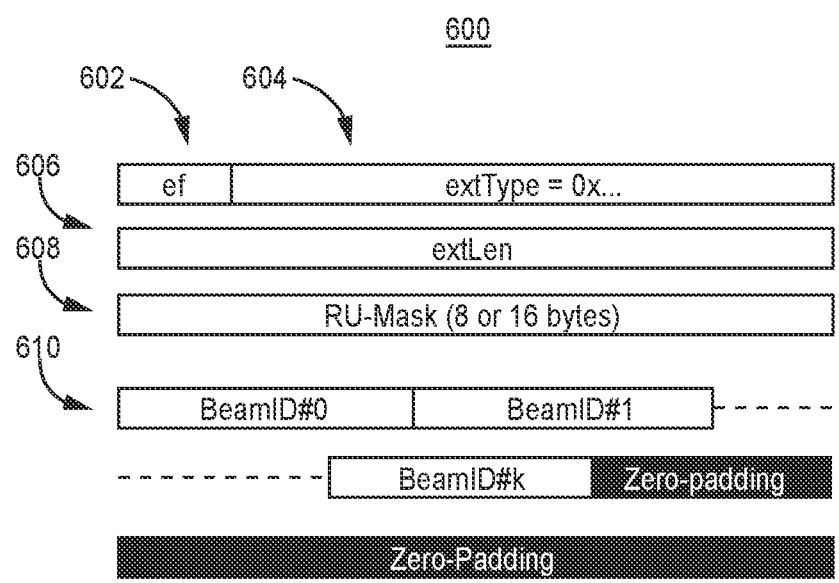
FIG. 6 illustrates a new section extension for use with the O-RAN fronthaul specification.
Figure 7:
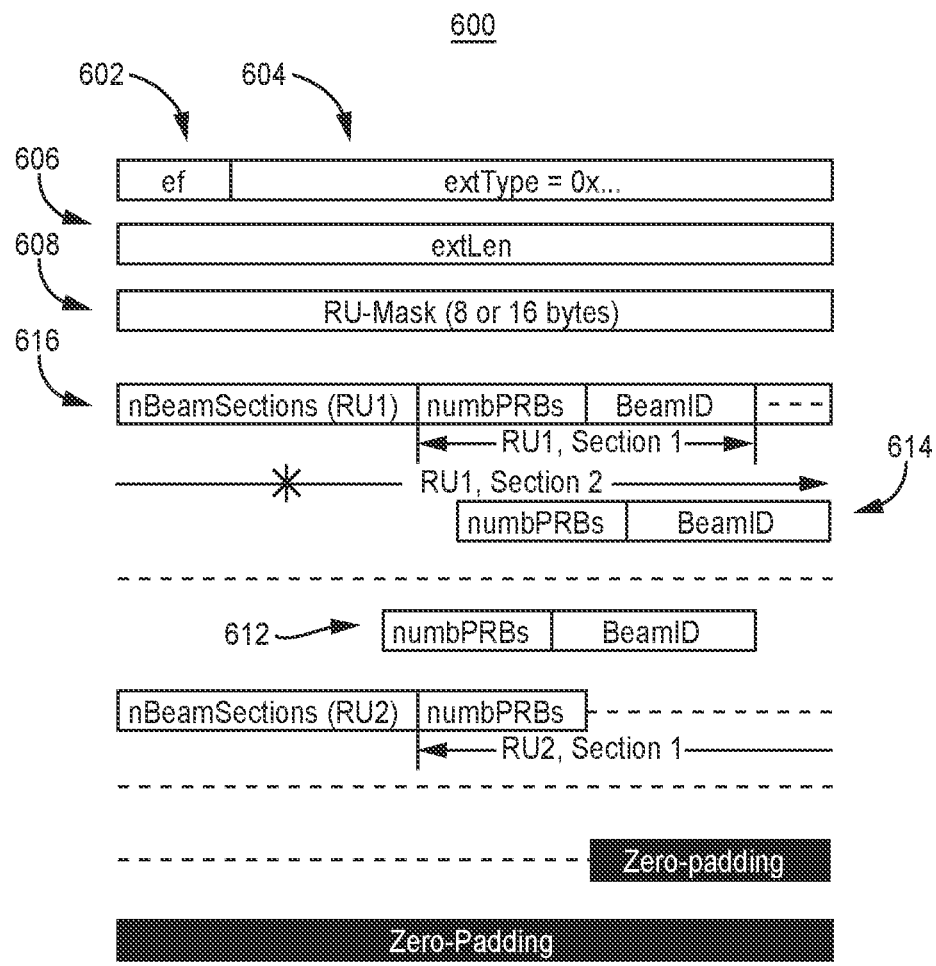
FIG. 7 illustrates a third option for specifying how each RU that is flagged in a RU mask field is to perform beamforming for the section data described in the associated C-plane message (and communicated in the one or more U-plane messages associated with that C-plane message).
Figure 13:
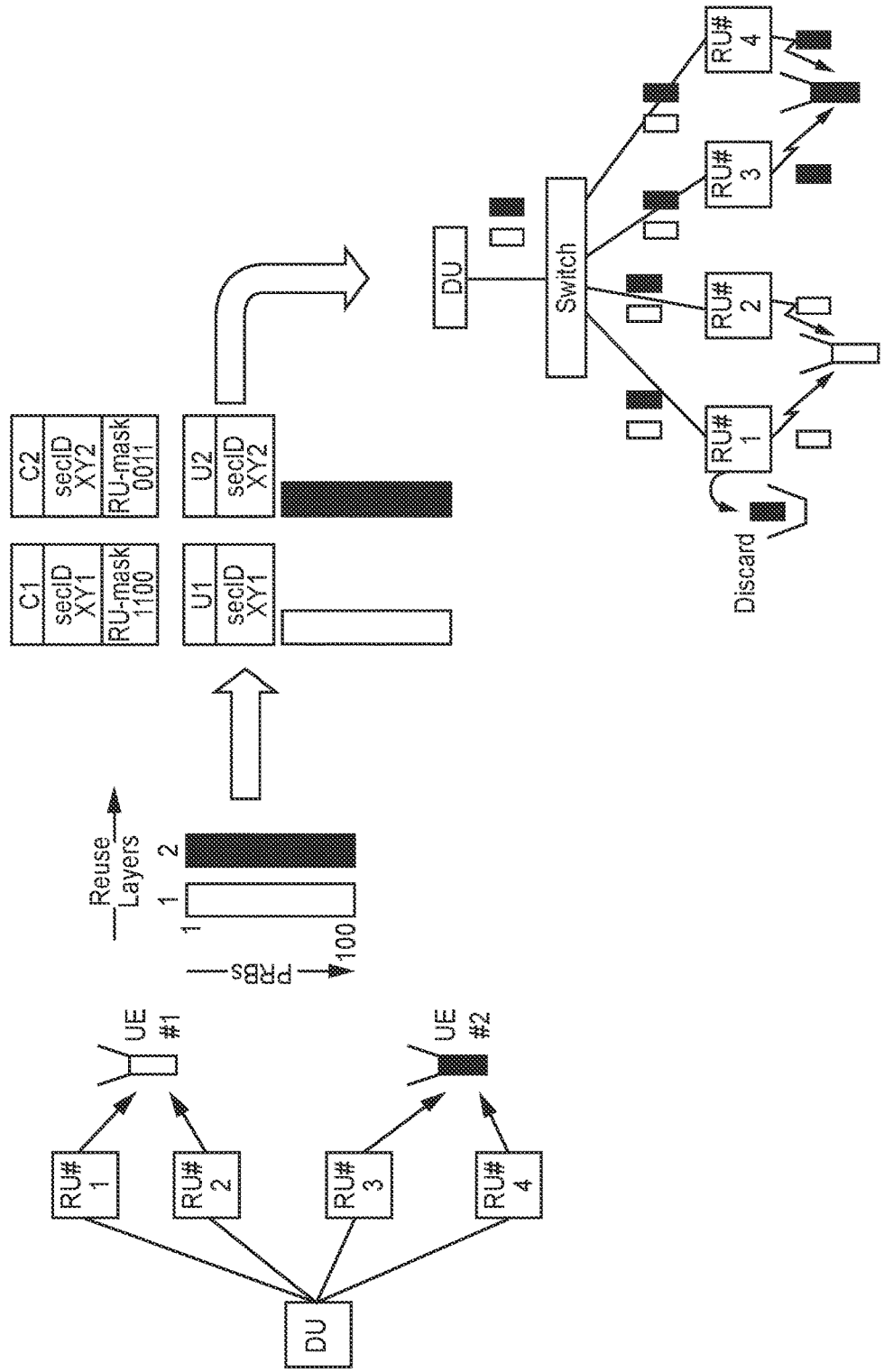

FIG. 13 illustrates one exemplary use case for the new section extension described here where the approach described in connection with FIGS. 5-7 is used.

Figure 14:
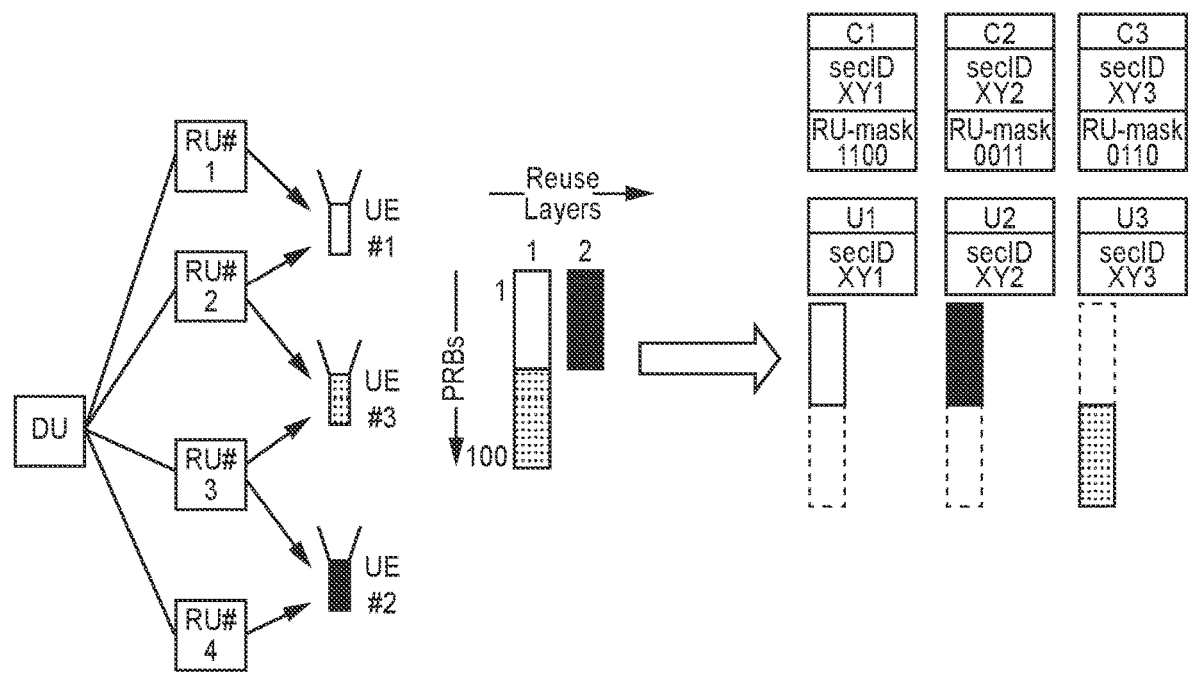

FIG. 14 illustrates another exemplary use case for the new section extension described here where the approach described in connection with FIGS. 5-7 is used.

Figure 15:
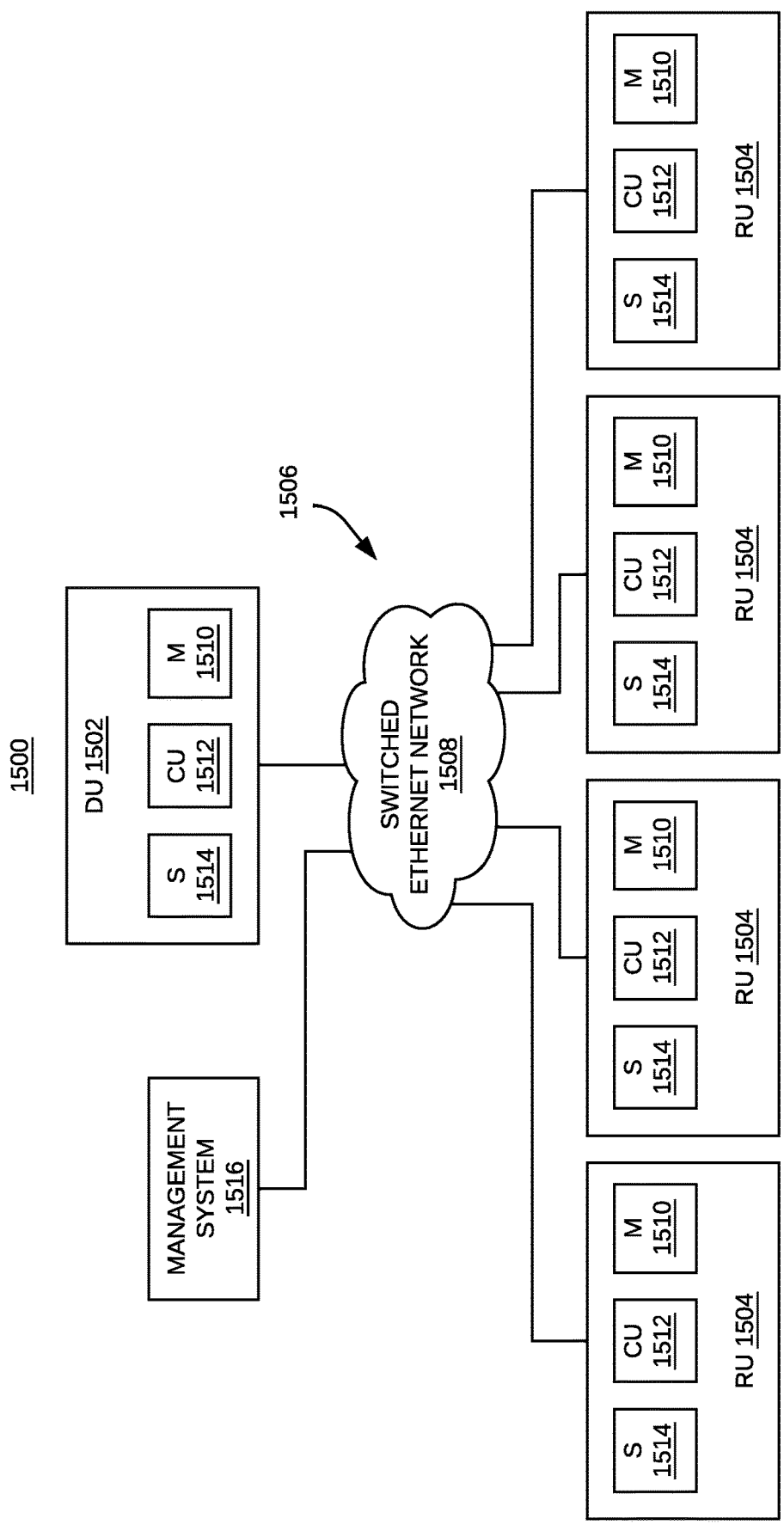

FIG. 15 is a high-level block diagram illustrating one exemplary embodiment of management-plane functionally used in an O-RAN system that can be used to implement a switched network shared cell configuration.

Figure 16:
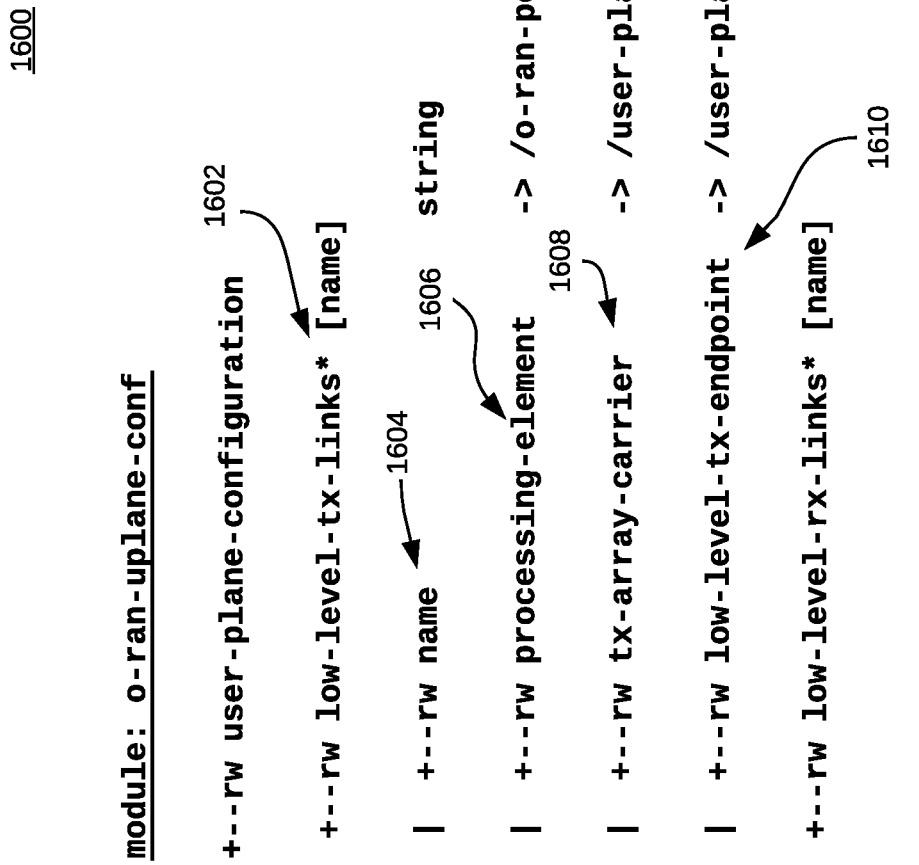

FIG. 16 illustrates a portion of an O-RAN user-plane configuration module.

Figure 17:
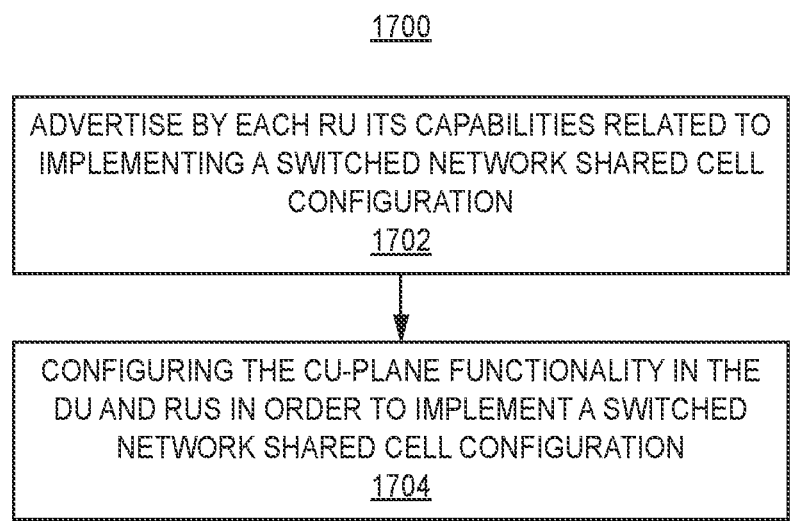

FIG. 17 comprises a high-level flowchart illustrating one exemplary embodiment of a method of configuring an RU for use in implementing a switched network shared cell configuration.

Figure 18:
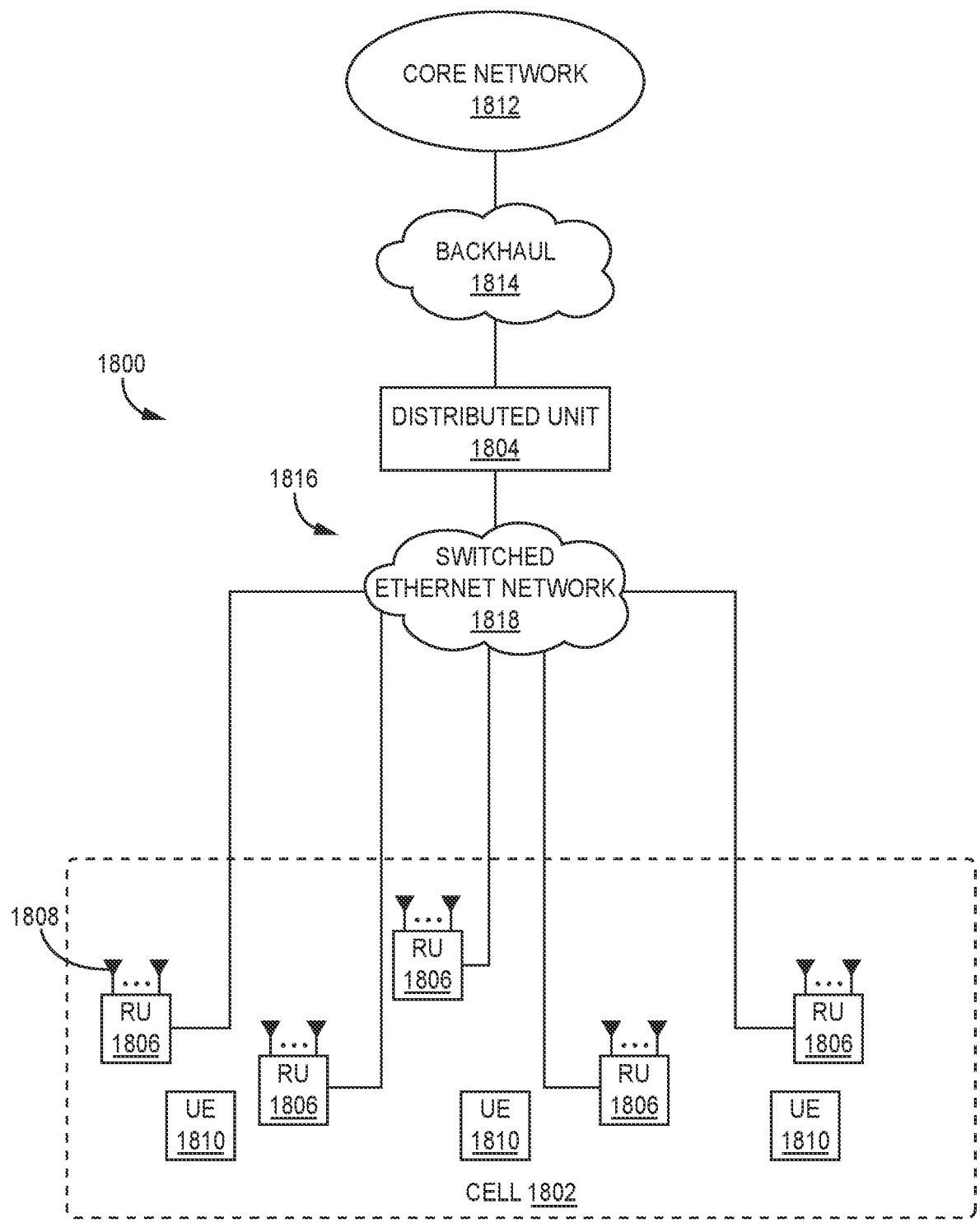

FIG. 18 is a block diagram illustrating one exemplary embodiment of a radio access network (RAN) system in which the new section extension, the methods described in connection with FIGS. 11-12, and the management-plane techniques described in connection with FIGS. 15-18 can be used.

Like reference numbers and designations in the various drawings indicate like elements.

DETAILED DESCRIPTION

In the early versions of the O-RAN specifications, a point-to-point configuration is used in which each DU entity is paired with a single RU entity to serve a single physical cell, with a separate O-RAN fronthaul interface instantiated for that DU and RU pair. The O-RAN fronthaul interface is used for communicating control plane and user plane messages that are unique to that DU and RU pair.

Figure 1:
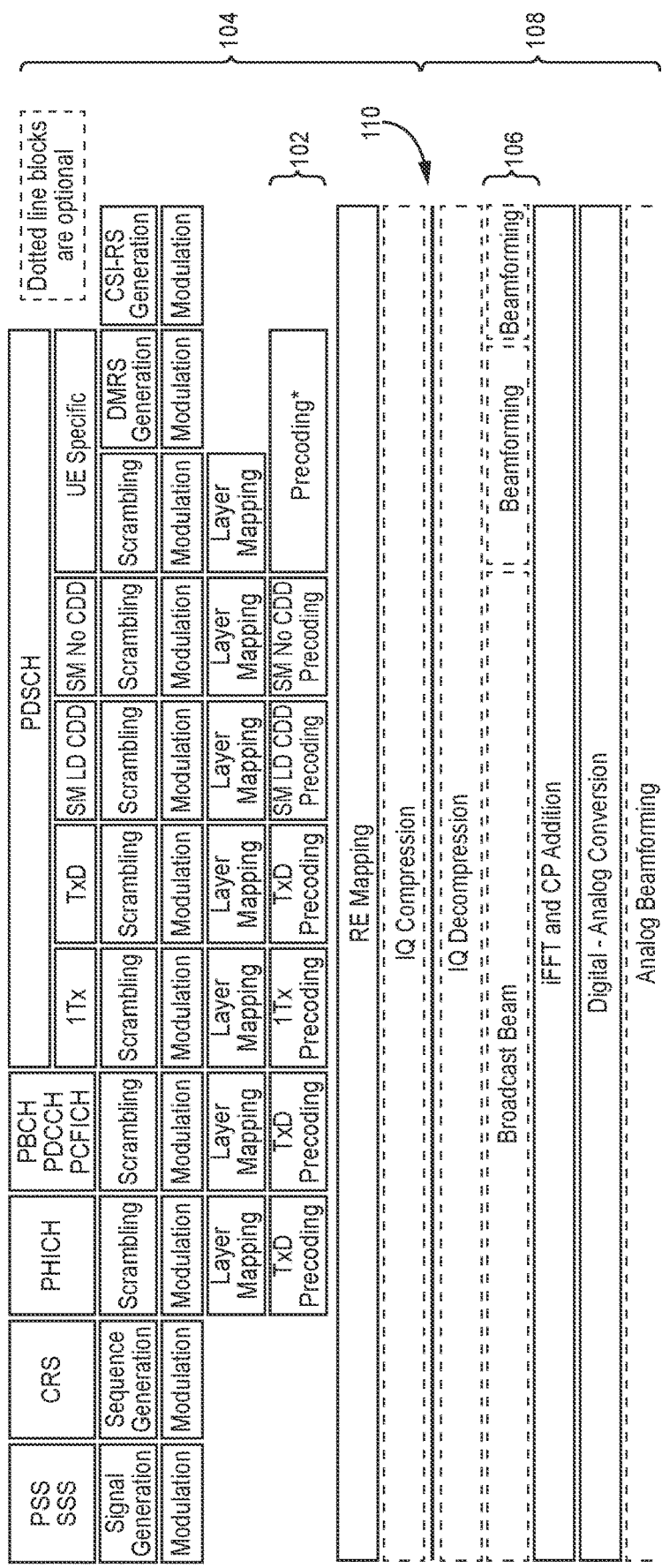
FIG. 1 illustrates the 7-2x functional split used for the downlink where the precoding function is implemented in the DU.
Figure 2:
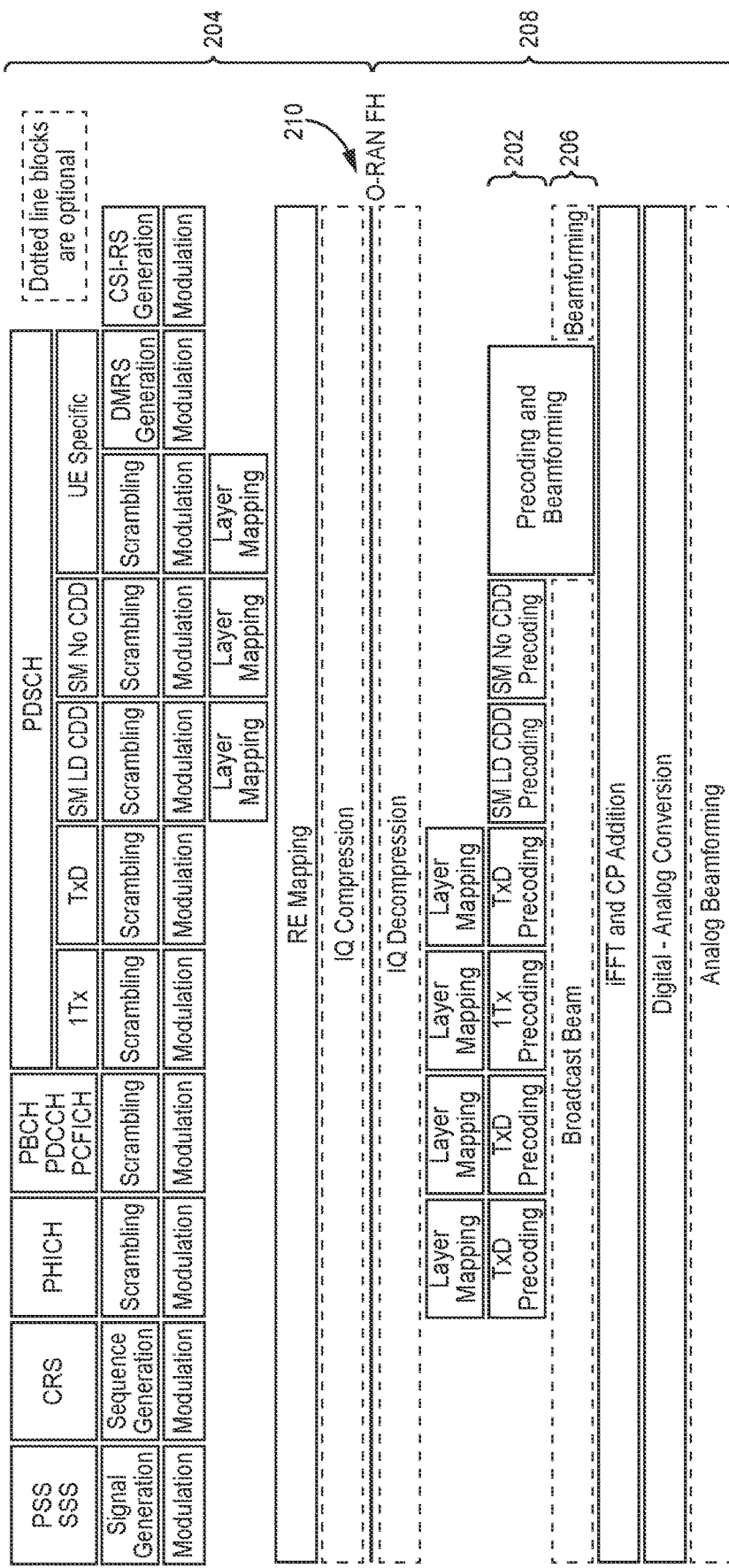
FIG. 2 illustrates the 7-2x functional split used for the downlink where the precoding function is implemented in the RU.
Figure 3:
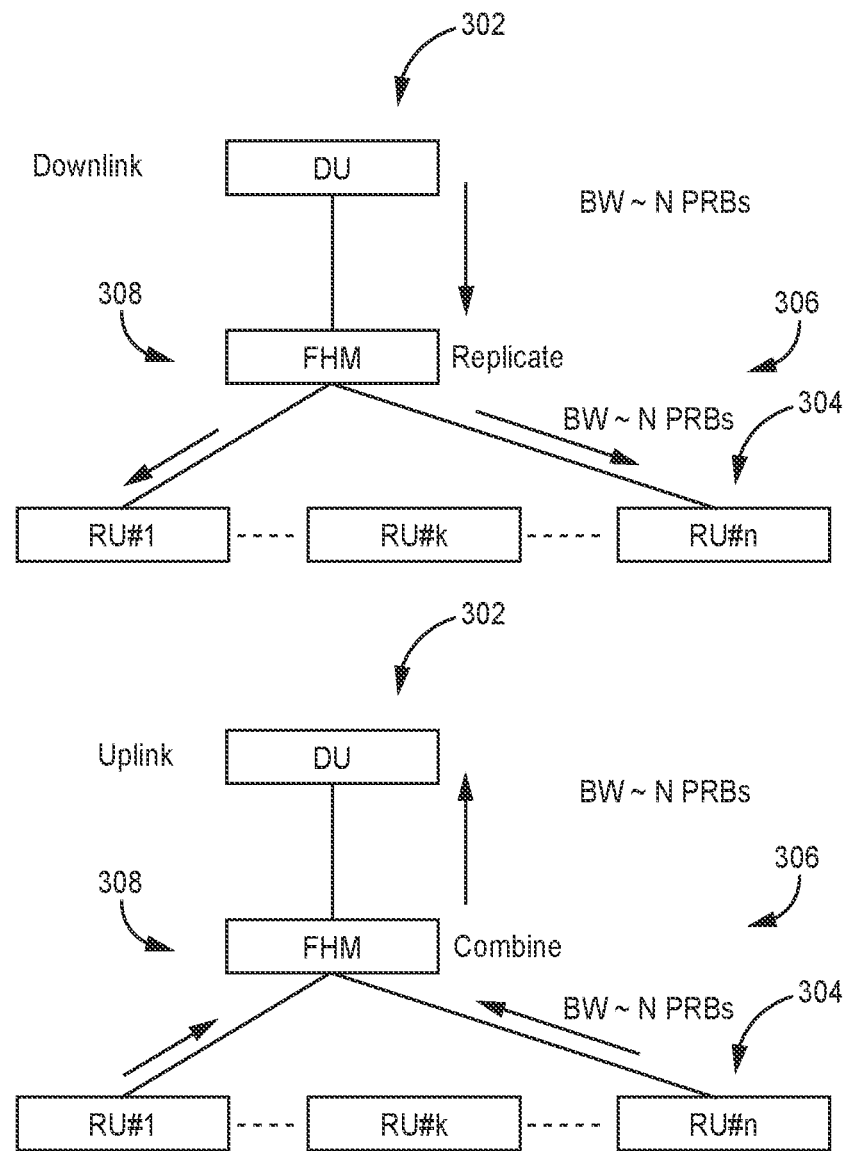
FIG. 3 illustrates a first shared cell configuration.

A new O-RAN specification is being developed that defines additional configurations that can be used to implement a "Shared Cell" in which a single DU is paired with multiple RUs to serve a single physical cell. This O-RAN Shared Cell specification describes two such topologies. FIG. 3 illustrates a first shared cell configuration 300. In the shared cell configuration 300 shown in FIG. 3, a single DU 302 is paired with multiple RUs 304. The DU 302 and RUs 304 communicate with each other over a fronthaul 306 that includes a fronthaul multiplexer (FHM) 308. This configuration is also referred to here as the "FHM configuration." In the downlink, the DU 302 communicates a single copy of each control-plane and user-plane message to the FHM 308, which duplicates each control-plane and user-plane message and communicates a respective copy to each of the multiple RUs 304. In the uplink, each RU 304 communicates user-plane messages to the FHM 308. The FHM 308 combines the resource elements (REs) received from all of the RUs 304 for each slot and then sends a single user-plane message including the combined REs for that slot to the DU 302.

Figure 4:
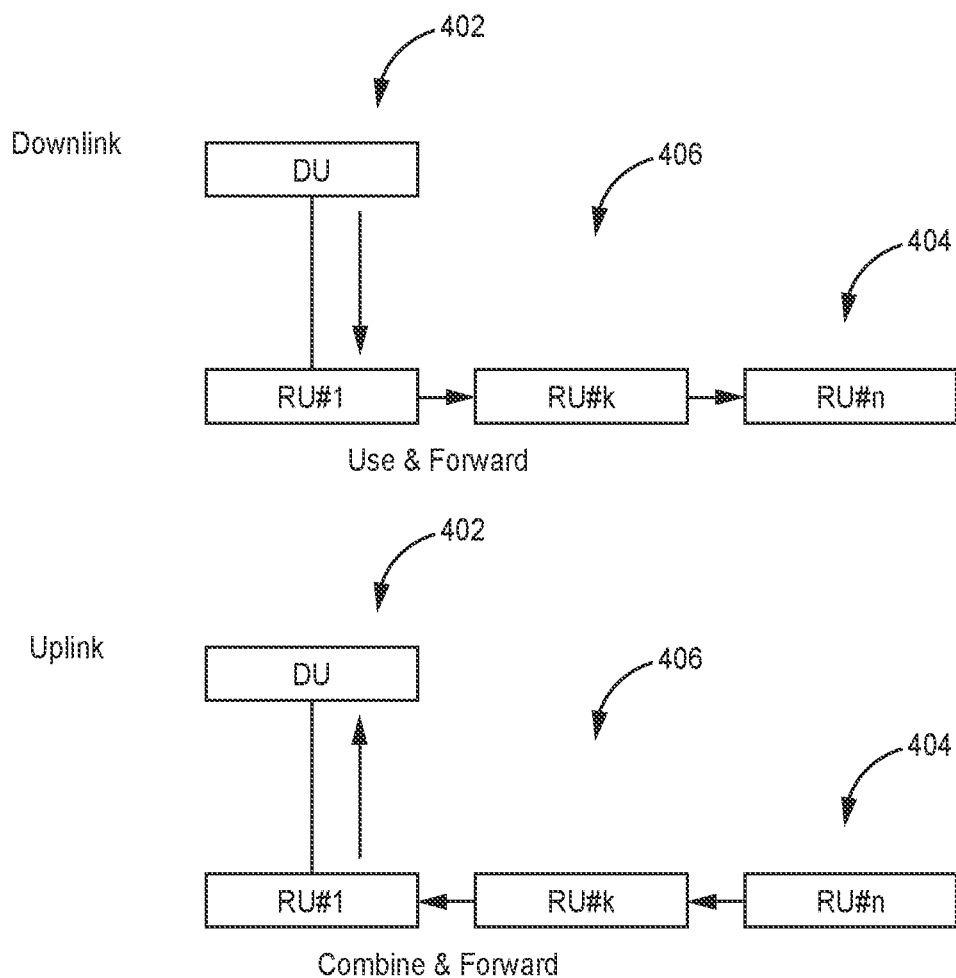
FIG. 4 illustrates a second shared cell configuration.

FIG. 4 illustrates a second shared cell configuration. In the shared cell configuration 400 shown in FIG. 4, a single DU 402 is paired with multiple RUs 404 to serve a single physical cell. In this configuration, a cascade topology is used to implement the fronthaul 406 over which the DU 402 and RUs 404 communicate with each other. In this topology, the DU 402 communicates directly with the first RU 404 in the cascade. Each RU 404 directly communicates with the unit (either the DU 402 or the RU 404) that immediately precedes it in the cascade and the RU 404 that immediately follows it in the cascade. In the downlink, the DU 402 communicates a single copy of each control-plane and user-plane message to the first RU 404 in the cascade. Each RU 404 in the cascade uses each message communicated to it from the preceding unit in the cascade and also forwards a copy of the message to the next RU 404 in the cascade. In the uplink, the last RU 404 in the cascade transmits uplink user-plane messages to the RU 404 that immediately precedes it in the cascade. Each RU 404 receives the uplink user-plane messages transmitted to it from the RU 404 that immediately follows it in the cascade. For each user-plane message that a RU 404 receives from the RU 404 that immediately follows it in the cascade, the RU 404 combines the REs included in the received message with the REs generated at that RU 404 from the uplink radio frequency (RF) signals it receives for the corresponding slot and forwards a user-plane message including the combined REs to the unit (either a DU 402 or RU 404) that immediately precedes that RU 404 in the cascade.

In both of these shared cell configurations, the same downlink user-plane data is transmitted from all of the RUs for each resource element, and uplink user-plane data from all of the RUs is combined for each resource element prior to performing the receiver processing in the DU. That is, even though these shared cell configurations employ multiple RUs, they do not support frequency reuse. As used here, "frequency reuse" refers to situations where separate downlink data intended for different UEs is simultaneously transmitted to the UEs using the same physical resource blocks (PRBs) for the same cell. For those PRBs where frequency reuse is used, each of the multiple reuse UEs is served by a different subset of the RUs serving the cell, where no RU is used to serve more than one UE for those reused PRBs. Typically, these situations arise where the reuse UEs are sufficiently physically separated from each other so that the co-channel interference resulting from the different downlink transmissions is sufficiently low. The following describes techniques that enable frequency reuse to be used while employing otherwise standard O-RAN fronthaul interfaces.

FIG. 5A illustrates a third shared cell configuration 590. In the shared cell configuration 590 shown in FIG. 5A, a single DU 592 is paired with multiple RUs 594. The DU 592 and RUs 594 communicate with each other over a fronthaul 596 that is implemented using a switched Ethernet network 598. In this third shared cell configuration 590, an FHM is not used. This third configuration is also referred to here as the "switched network shared cell configuration" or simply the "SN shared cell configuration." In the downlink, the DU 592 can address each control-plane and user-plane message to a single RU 594 or to a set of multiple RUs 594. That is, the DU 592 can use unicast transmission to transmit each control-plane and user-plane message to a single RU 594 or use multicast transmission to transmit each control-plane and user-plane message to a set of multiple RUs 594. In some embodiments, when a downlink control-plane or user-plane message is addressed to multiple RUs 594, replication of the message can be performed by one or more Ethernet switches in the Ethernet network 598 (using standard Ethernet multicast features). In such embodiments, only a single copy of each such message needs to be transmitted to each Ethernet switch performing such replication, thereby reducing the bandwidth required over the ingress links of such Ethernet switches. In the uplink, each RU 594 communicates control-plane and user-plane messages to the DU 592 over the switched Ethernet network 598 using unicast transmission. With the SN configuration, any combining of data from uplink user-plane messages is performed by the DU 592.

Generally, the messages communicated over the O-RAN fronthaul can be categorized into four types: management-plane (M-plane) messages, control-plane (C-plane) messages, user-plane (U-plane) messages, and synchronization-plane (S-plane) messages. M-plane messages comprise messages that pertain to the instantiation, configuration and management of each DU and RU. M-plane messages are communicated infrequently, typically during initial configuration and bring-up and during system reconfigurations. U-plane messages are sent in each slot and are used to communicate sections of user data (that is, RE data for the PRBs to be transmitted in the downlink and RE data for the received PRBs in the uplink). Downlink U-plane messages are sent from the DU to each RU to provide the RU with the sections of user data to be transmitted from that RU during each slot. S-plane messages are sent to and from the DU and each RU in order to synchronize the DU and RU.

C-plane messages are sent in each slot. Downlink C-plane messages are sent from the DU to each RU to provide the RU with information regarding the configuration of the user data included in the associated U-plane messages for that slot. The information carried by downlink C-plane messages includes: information specifying which antenna port the associated section of user data is intended for, the set of PRBs over which the associated section of user data should be transmitted, a resource element (RE) mask to designate a subset of REs within each PRB for use with different beams transmitted during the same PRB, beamforming information, and time-division duplexing (TDD) Information (for example, a downlink/uplink direction bit).

Each C-plane message can correspond to multiple U-plane messages. This is done in order to enable fragmentation of each section of user data into multiple packets to comply with Ethernet and IP packet size restrictions for the associated fronthaul. At least one U-plane message is required per symbol.

FIG. 5 illustrates one example of a C-plane message 500 for a section of user data that is fragmented into multiple U-plane messages 502. In general, except as described below, the C-plane and U-plane messages are formatted in accordance with the O-RAN fronthaul specification.

As shown in FIG. 5, each C-plane message 500 and U-plane message 502 includes an enhanced Common Public Radio Interface (eCPRI) transport layer header 504 and eCPRI transport layer payload 506. The eCPRI transport layer header 504 includes, among other fields, an identifier 508 that identifies the specific data flow associated with that message. For each C-plane message 500, this identifier 508 is referred to as the eCPRI real time control data message series identifier (ecpriRtcid) 508. For each U-plane message 502, this identifier 508 is referred to as the eCPRI IQ data transfer message series identifier (ecpriPcid) 508. The ecpriRtcid 508 of the C-plane message 500 must match the ecpriPcid 508 of the corresponding U-plane messages 502.

The eCPRI transport layer payload 506 of each C-plane and U-plane message 500 and 502 is used to communicate application layer data. This application layer data comprises common header fields 510 for communicating information that applies to all sections (for example, time reference information), section fields 512 for describing a set of PRBs for a given section of user data, and, in the case of U-plane messages, the resource element (RE) data 514 that comprises the RE data for the particular PRBs described in the section fields 512.

Of particular note, the section fields 512 of both the C-plane and U-plane messages 500 and 502 include a section identifier (SectionID) field 516 that is used to identify the particular section of user data that the set of PRBs being described are associated with, a starting PRB (startPrbc) field 518 that is used to specify the starting PRB of the set of PRBs being described, and a number PRBs (numPrbc) field 520 that is used to specify the number of contiguous PRBs for the set of PRBs being described.

The SectionID 516 of the C-plane message 500 must match the SectionID 516 of the corresponding U-plane messages 502.

In the particular example shown in FIG. 5, the C-plane message 500 and U-plane messages 502 are associated with a section of user data that comprises 66 PRBs. The set of PRBs being described by the section fields 512 of the C-plane message 500 includes all 66 PRBs for that section of user data. Therefore, the startPrbc field 518 of the C-plane message 500 has the value "0", and the numPrbc field 520 of the C-plane message 500 has the value "66".

In the example shown in FIG. 5, the section of user of data is fragmented into two U-plane messages 502. The first U-plane message 502 is used to communicate a set of PRBs starting with the first PRB (indicated in the startPrbc field 518 with the value "0") and including 33 contiguous PRBs (indicated in the numPrbc field 520 with the value "33"). The second U-plane message 502 is used to communicate a set of PRBs starting with the thirty-fourth PRB (indicated in the startPrbc field 518 with the value "33") and including 33 contiguous PRBs (indicated in the numPrbc field 520 with the value "33").

As shown in FIG. 5, the section fields 512 of the C-plane message 500 also include an extension flag (ef) field 522 and a beamforming identifier (beamID) field 524. Each RU stores various beamforming configurations unique to that RU. Each beamforming configuration stored at a given RU has a respective beamID that can be used to identify that particular configuration in order to use the associated configuration for performing beamforming or to replace the beamforming configuration associated with that beamID with a new beamforming configuration (for example, by storing new beamforming weights and/or beamforming attributes communicated to that RU in a C-plane message). The ef field 522 is a bit that indicates whether the section description will include just the beamID stored in the beamID field 524 or will include another section extension 526 after the beamID field 524. A value of "0" in the ef field 522 indicates the former case, whereas a value of "1" in the ef field 522 indicates the latter case.

It is noted that where the new section extension 600 described below is used to specify the beamforming to be performed on a per-RU basis, the beamID field 524 is ignored.

Section extensions 526 are used to convey special information for particular types of section data. Examples of section extensions include beamforming weights, beamforming attributes, precoding configuration parameters and indications (applicable for some Long Term Evolution (LTE) transmission modes (TMs)), and modulation compression information.

Additional information about section extensions and the format of the C-plane and U-plane messages can be found in the O-RAN fronthaul specification.

Moreover, although FIG. 5 illustrates one example that uses fields for Section Type 1, it is to be understood that the new section extension 600 described below can be used with messages that use other Section Types (including, for example, Section Type 3 for mixed numerology). More information about these different Section Types (and the associated fields) can be found in the O-RAN fronthaul specification.

FIG. 6 illustrates a new section extension 600 for use with the O-RAN fronthaul specification. This new section extension 600 can be used to enable downlink frequency reuse to be used in configurations where a DU is paired with multiple RUs to serve a single cell. This new section extension 600 can be used with Category A RUs (that is, where precoding is performed in the DU). This new section extension 600 can be used to communicate different section data to different RUs.

The new section extension 600 includes an extension flag (ef) field 602 that indicates whether the given section extension description is the final section extension description (indicated with a value of "0") or if there is another section extension description following the current one (indicated with a value of "1"). The new section extension 600 shown in FIG. 6 also includes an extension type (extType) field 604 that is used to indicate that the new section extension type being defined here is to be used by storing a value in this field that has been assigned to the new section extension 600. The new section extension 600 shown in FIG. 6 also includes an extension length (extLen) field 606 that is used to store the length of the particular section extension being defined. The ef field 602, extType field 604, and extLen field 606 of the new section extension 600 shown in FIG. 6 are implemented and used in the standard manner as specified in the O-RAN fronthaul specification.

The new section extension 600 shown in FIG. 6 includes a RU mask field 608, which is a bit mask having a length that is equal to the number of RUs served by the DU in the current configuration. Each RU is associated with one of the bits in the bit mask stored in the RU mask field 608. The section data described in the associated C-plane message (and communicated in the one or more U-plane messages associated with that C-plane message) is intended for a given RU if the bit position in the RU mask field 608 associated with that RU has a value of "1" stored therein and is not intended for a given RU if the bit position in the RU mask field 608 associated with that RU has a value of "0" stored therein. That is, bit position #m in the RU mask field 608 has the value "1" stored therein if the section data described in the associated C-plane message (and communicated in the one or more U-plane messages associated with that C-plane message) is intended for RU #m. The bit position #m in the RU mask field 608 has a value of "0" stored therein if the section data described in the associated C-plane message (and communicated in the one or more U-plane messages associated with that C-plane message) is not intended for RU #m. Each RU #m that has a value "1" stored in the corresponding bit position #m of the RU mask field 608 that is associated with that RU #m is referred to here as being "flagged" in the RU mask field 608, and each RU #m that has a value "0" stored in the corresponding bit position #m of the RU mask field 608 that is associated with that RU #m is referred to here as being "not flagged" in the RU mask field 608.

The mapping of each RU to a particular bit position in the RU mask field 608 can be configured via a M-plane procedure.

The remainder of the new section extension 600 is used to specify how each RU that is flagged in the RU mask field 608 is to perform beamforming for the section data described in the associated C-plane message (and communicated in the one or more U-plane messages associated with that C-plane message).

A first option for how this is done is shown in FIG. 6. With this first option, a set of beamIDs 610 follows the RU-mask field 608, where the set of beamIDs 610 includes a respective beamID 610 for each RU flagged in the RU mask field 608. That is, the number of beamIDs 610 included in the set of beamIDs 610 should be equal to the number of RUs flagged in the RU mask 608.

The order in which the beamIDs 610 appear in the set of beamIDs 610 corresponds to the order in which the RUs occur in the RU mask field 608 (for example, read in order from the left-most bit to the right-most bit). That is, as shown in FIG. 6, the first bit position in the RU mask field 608 (bit position #0) corresponds to RU #0 and the first beamID in the set of beamIDs (beamID #0) corresponds to that RU #0. More generally, bit position #m in the RU mask field 608 corresponds to RU #m and beamID #m in the set of beamIDs corresponds to that RU #m. Each beamID 610 is formatted and has the same length as described in the O-RAN fronthaul specification.

With this first option, the specified beamID is used for all PRBs included in the section data described in the associated C-plane message (and communicated in the one or more U-plane messages associated with that C-plane message).

In a second option for specifying how each RU that is flagged in the RU mask field 608 is to perform beamforming for the section data described in the associated C-plane message (and communicated in the one or more U-plane messages associated with that C-plane message), a variant of the first option shown in FIG. 6 is used. In this second option, beam weights and/or beam attributes can be conveyed along with the beamID 610 in the same manner described in the O-RAN fronthaul specification for extension types 1 and 2. In one implementation of this second option, the beamforming configuration stored at the associated RU using the specified beamID is updated with the beamforming weights and/or attributes that are conveyed with the beamID.

A third option for specifying how each RU that is flagged in the RU mask field 608 is to perform beamforming for the section data described in the associated C-plane message (and communicated in the one or more U-plane messages associated with that C-plane message) is shown in FIG. 7. With this third option, a different beamID can be specified for different subsets of the PRBs included in the section data described in the associated C-plane message. Each different subset of PRBs has a corresponding "beamID section" that includes a field 612 that specifies the number of PRBs included in that subset and a beamID field 614 that specifies the beamID to be used for the PRBs included in that subset. Field 612 is also referred to here as the NumPRBs field 612. The various beamID sections are preceded by a field 616 that specifies the number of beamID sections that are being specified for the associated RU. Field 616 is also referred to here as the nBeamSections field 616.

As shown in FIG. 7, for each RU flagged in the RU mask field 608 (using the same ordering used in the RU mask field 608), a corresponding nBeamSections field 616 is included followed by the set of beam ID sections for that RU. The beamID sections are presented in the same order specified by the section header 512, where the PRBs are counted starting with the PRB specified in the startPrbc field 518 of the section header 512 and counted in contiguous chunks up to the number of PRBs specified in the NumPRBs field 612. The sum of the number of PRBs specified in the NumPRBs fields 612 for all of the beamID sections for a given RU should equal the number of PRBs specified in the numPrbc field 520 of the section header 512 (that is, the sum should equal numPRBc).

In a fourth option for specifying how each RU that is flagged in the RU mask field 608 is to perform beamforming for the section data described in the associated C-plane message (and communicated in the one or more U-plane messages associated with that C-plane message), a variant of the third option shown in FIG. 7 is used. In this fourth option, beam weights and/or beam attributes can be conveyed along with the beamID 614 in each beamID section. The beam weights and/or beam attributes can be conveyed (following the corresponding beamID 614) in the same manner described in the O-RAN fronthaul specification for extension types 1 and 2. In one implementation of this fourth option, the beamforming configuration stored at the associated RU using the specified beamID is updated with the beamforming weights and/or attributes that are conveyed with the beamID.

As noted above, where the new section extension 600 is used to specify the beamforming to be performed on a per-RU basis, the general beamID field 524 described above is ignored.

One issue with the new section extension 600 described above in connection with FIGS. 5-7 is that the RU mask field 608 is included within the new section extension 600 that is communicated only in C-plane messages. As a result, the determination as to whether a U-plane message 502 should be used or discarded by a particular RU (or forwarded to a particular RU) requires that the corresponding C-plane message (and the new section extension 600 included therein) has been decoded and parsed, a determination has been made as to whether the RU mask field 608 included in the new section extension 600 indicates that the corresponding U-plane messages should be used or discarded (or forwarded), and information about that determination and the corresponding SectionID has been tracked for later use when the corresponding U-plane messages are received. This decoding, parsing, and tracking of each such C-plane message must be done even if the C-plane message and the associated U-plane messages are not intended for the relevant RU. An alternative embodiment of the new section extension that addresses this issue is described below in connection with FIGS. 8-10.

Figure 8:
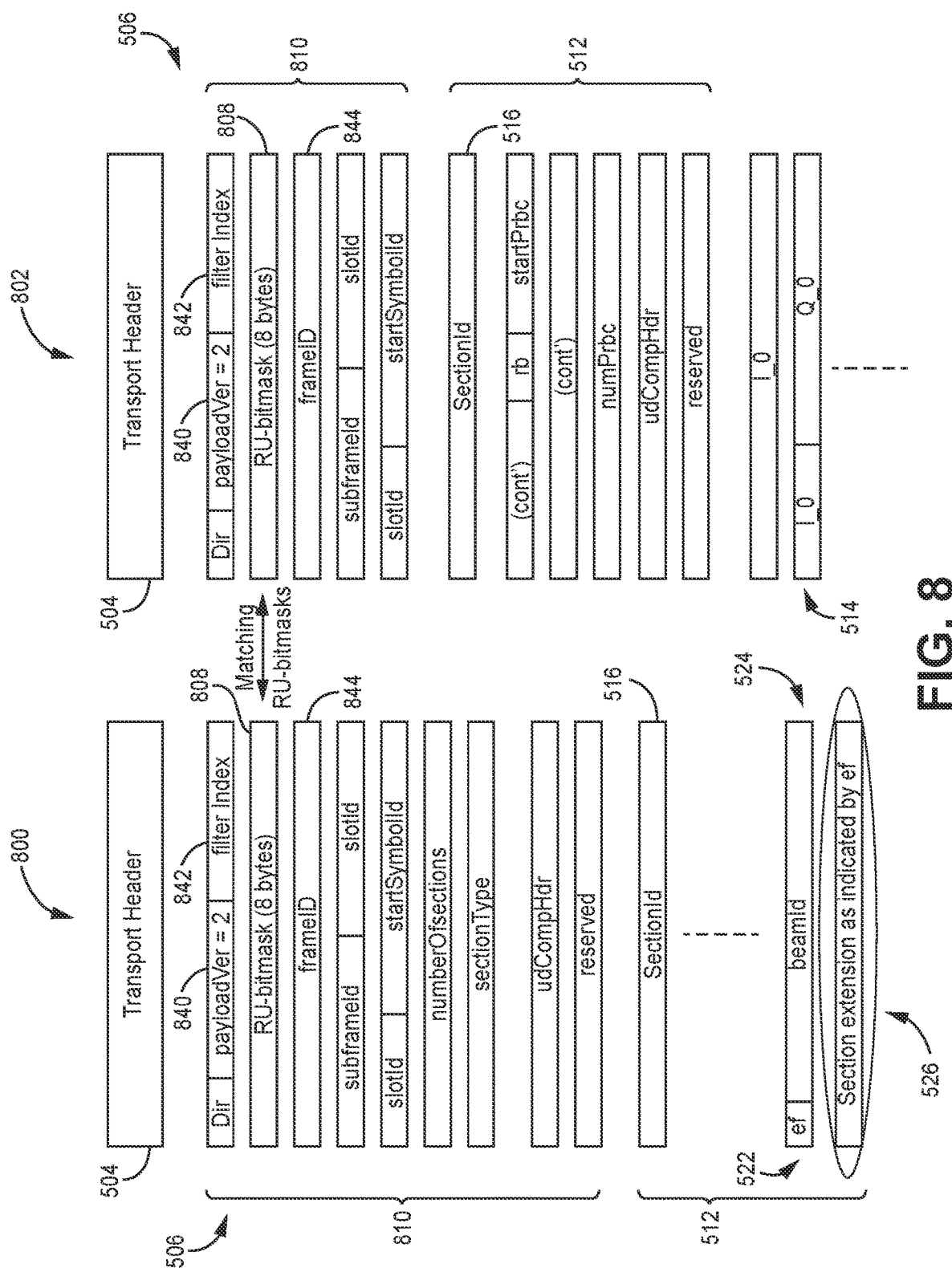
FIG. 8 illustrates one example of a C-plane message for a section of user data that is fragmented into one or more U-plane messages.

FIG. 8 illustrates one example of a C-plane message 800 for a section of user data that is fragmented into one or more U-plane messages 802 (only one of which is shown in FIG. 8). In general, except as described below, the C-plane messages 800 and U-plane messages 802 are the same as the C-plane messages 500 and U-plane messages 502, respectively, shown in FIG. 5, the description of which is generally not repeated for the sake of brevity.

In the example shown in FIG. 8, a RU mask field 808 is included in the common header fields 810 that are communicated in the application layer data of the C-plane message 800 and the U-plane messages 802. The RU mask field 808 applies to all sections included in the application layer data (each section being defined by a corresponding set of section fields 512).

Figure 9:
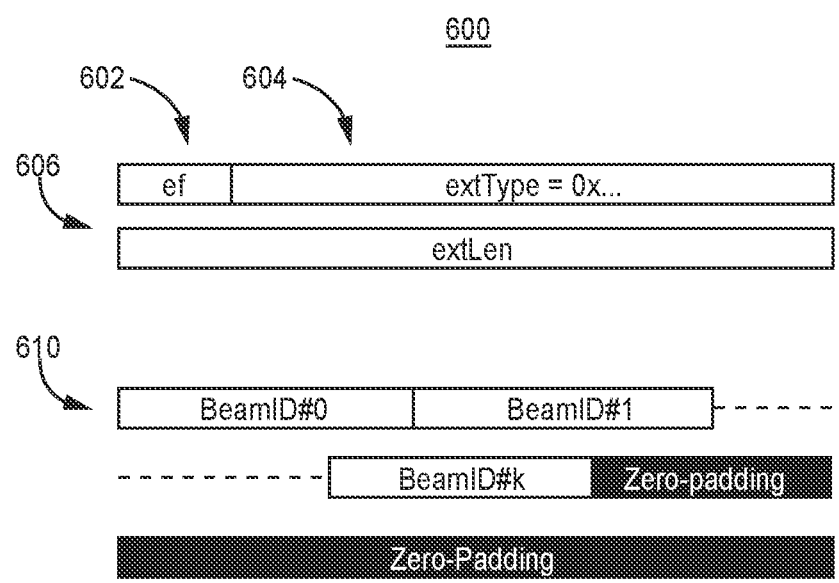
FIGS. 9-10 illustrate one example of how a RU mask field can be included in common header fields of application layer data.
Figure 10:
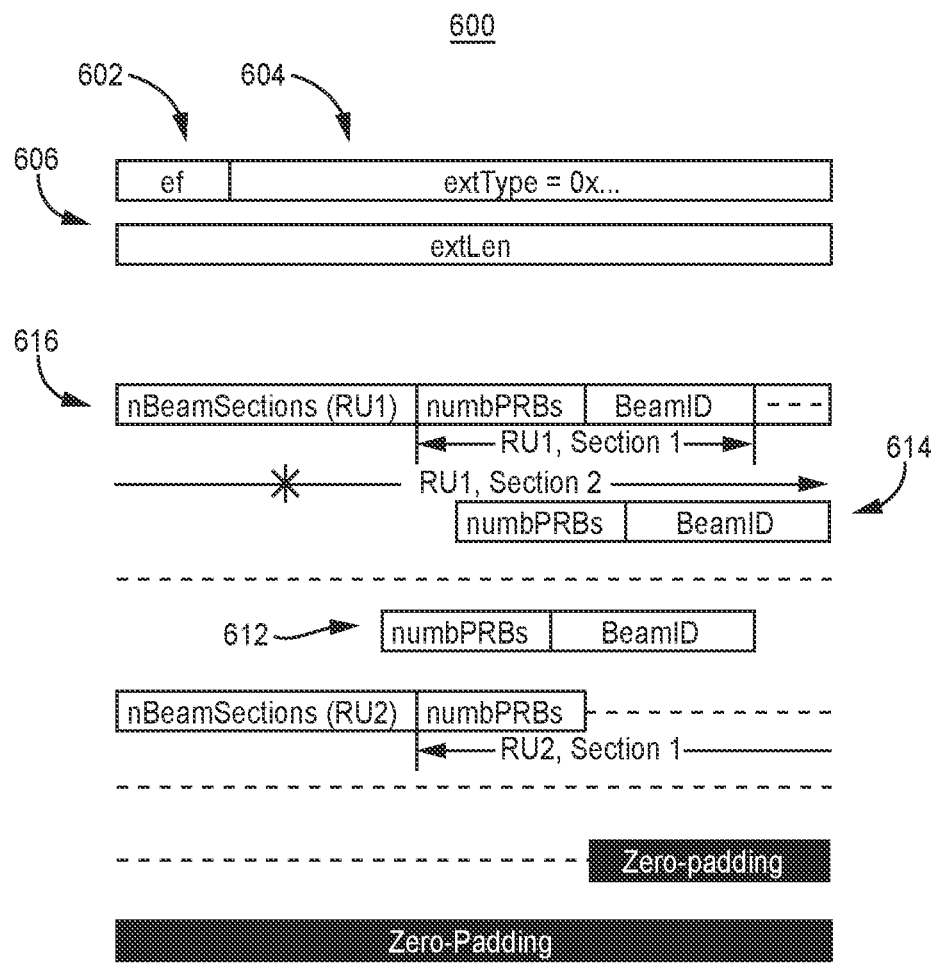

More specifically, as shown in FIG. 8, a new payload version is defined and used for communicating the RU mask field 808 in the common header fields 810 of the application layer data. For example, as shown in FIG. 8, this new payload version can be assigned the number 2. The newly defined payload version is stored in the payload version field (payloadVer) 840 of the common header fields 810 and the RU mask field 808 is included in the common header fields 810 between the filter index field 842 and the frame identifier field 844. In this example, because the RU mask field 808 is included in the common header fields 810 of the application layer data, it is not included in the new section extension 600 (as shown in FIGS. 9-10). It is to be understood that this is one example of how the RU mask field 808 can be included in the common header fields 810 of the application layer data and that this can be done in other ways (for example, the new section extension 600 can also include a RU mask field 608 in which the same RU mask stored in the RU mask field 808 of the common header fields 810 is also stored).

The RU mask stored in the RU mask field 808 itself is formatted (and used) in the same way as the RU mask stored in the RU mask field 608 described above in connection with FIGS. 5-7.

As noted above, unlike with the example described above in connection with FIGS. 5-7, the same RU mask field 808 is included in the C-plane message 800 and the corresponding U-plane messages 802. As a result, the determination as to whether a particular RU should use or discard a C-plane message 800 or U-plane message 802 (or have the message 800 or 802 forwarded to a particular RU) requires only that the common header fields 810 of that particular message 800 or 802 be decoded and the RU mask stored in the RU mask field 808 included therein be checked, which can be simpler to implement than the approach described above in connection with FIGS. 5-7.

FIG. 11 comprises a high-level flowchart illustrating one exemplary embodiment of a method 1100 of generating and transmitting C-plane and U-plane messages that include the new section extension described above.

The embodiment of method 1100 shown in FIG. 11 is described here as being implemented in an O-RAN system of the type described above in which a DU is paired with multiple RUs to serve a single cell (though it is to be understood that other embodiments can be implemented in other ways). More specifically, the processing of method 1100 is described here as being performed by the DU.

The blocks of the flow diagram shown in FIG. 11 have been arranged in a generally sequential manner for ease of explanation; however, it is to be understood that this arrangement is merely exemplary, and it should be recognized that the processing associated with method 1100 (and the blocks shown in FIG. 11) can occur in a different order (for example, where at least some of the processing associated with the blocks is performed in parallel and/or in an event-driven manner). Also, most standard exception handling is not described for ease of explanation; however, it is to be understood that method 1100 can and typically would include such exception handling.

Method 1100 comprises determining, for each slot, the allocation of PRBs to different UEs (block 1102) and the corresponding allocation of a subset of RUs from which the UEs will receive wireless transmissions of the allocated PRBs (block 1104). In one exemplary embodiment, these determinations are made by the media access control (MAC) scheduler implemented in the DU.

Method 1100 further comprises generating, for that slot, C-plane and U-plane messages for each UE that has been allocated PRBs during that slot (block 1106). In one exemplary embodiment, this function is implemented in the DU. As a part of doing this, the DU determines how to group data efficiently in order to reduce the duplication of data communicated over the fronthaul and to reduce the number of packets used to communicate the C-plane and U-plane messages. The new section extension 600 described above is used in order to do this. More specifically, the RU mask field 608 included in the new section extension 600 of C-plane message 500 described above in connection with FIGS. 5-7 or the RU mask field 808 included in the common header fields 810 of both C-plane messages 800 and U-plane messages 802 described above in connection with FIGS. 8-10 are used to identify each RU to which the associated section data is intended for.

Method 1100 further comprises transmitting the C-plane and U-plane messages generated for that slot (block 1108). In one embodiment, the DU broadcasts the C-plane and U-plane messages to all of the RUs, in which case the RUs determine if the messages are intended for them using the RU mask field 608 included in the new section extension 600 of C-plane message 500 described above in connection with FIGS. 5-7 as described below in connection with FIG. 12A or the RU mask field 808 included in the common header fields 810 of both C-plane messages 800 and U-plane messages 802 described above in connection with FIGS. 8-10 as described below in connection with FIG. 12B. In an alternative embodiment, the DU narrowcasts each of the C-plane and U-plane messages to a subset of the RUs. In such an alternative embodiment, each such subset of RUs is associated with a respective multicast group and the DU is configured to select a multicast group (and associated subset of RUs) that includes all of the RUs the message is intended for while also including the lowest number of other RUs for which the message is not intended. If no suitable multicast group (and associated subset of RUs) exists, the message can be broadcast to all RUs.

The C-plane and U-plane messages can be generated and transmitted in an unbundled mode in which each C-plane and U-plane message conveys only a single new section extension (with a single RU mask field 608 or 808). The C-plane and U-plane messages can be formatted and communicated in a bundled mode using the approach described above in connection with FIGS. 5-7. With such a bundled mode, each C-plane conveys multiple section data descriptions (defined by multiple sets of section fields 512) and multiple new section extensions 600 (each having a different RU mask 608). In bundled mode, the corresponding U-plane messages can also convey multiple section data descriptions (defined by multiple sets of section fields 512) and multiple new section extensions 600 (each having a different RU mask 608). Each section data description (defined by a corresponding set of section fields 512) and each new section extension 600 is processed separately as described above. It is noted that this bundled mode violates the current assumption expressed in the O-RAN, that there will not be conflicting sets of RE data for the same PRB within the same U-plane message.

FIG. 12A comprises a high-level flowchart illustrating one exemplary embodiment of a method 1200 of receiving and processing downlink C-plane and U-plane messages that include new section extensions. The embodiment of method 1200 shown in FIG. 12A is suitable for use with the approach described in connection with FIGS. 5-7.

The embodiment of method 1200 shown in FIG. 12A is described here as being implemented in an O-RAN system of the type described above in which a DU is paired with multiple RUs to serve a single cell (though it is to be understood that other embodiments can be implemented in other ways). More specifically, the processing of method 1200 is described here as being performed by each RU.

The blocks of the flow diagram shown in FIG. 12A have been arranged in a generally sequential manner for ease of explanation; however, it is to be understood that this arrangement is merely exemplary, and it should be recognized that the processing associated with method 1200 (and the blocks shown in FIG. 12A) can occur in a different order (for example, where at least some of the processing associated with the blocks is performed in parallel and/or in an event-driven manner). Also, most standard exception handling is not described for ease of explanation; however, it is to be understood that method 1200 can and typically would include such exception handling.

Method 1200 is performed by each RU for each downlink C-plane message that is broadcast by the DU for each slot that includes a new section extension 600 using the approach described above in connection with FIGS. 5-7.

In the following description, the particular RU, downlink C-plane message, and new section extension 600 that method 1200 is described below in connection with are referred to here as the "current" RU, "current" downlink C-plane message, and "current" new section extension 600, respectively.

Method 1200 comprises identifying the RU mask stored in the RU mask field 608 and the SectionID stored in the SectionID field 516 of the current new section extension 600 (block 1202). That is, the current RU receives and decodes the current C-plane message and parses it in order to identify the RU mask stored in RU mask field 608 and the SectionID stored in the SectionID field 516 of the current new section extension 600.

Method 1200 further comprises determining if the RU mask indicates that the current new section extension 600 and the current C-plane message are intended for the current RU (block 1204). More specifically, the bit position in the RU mask that corresponds to the current RU is checked to see if it includes the bit value that indicates that the current new section extension and current C-plane message are intended for the current RU (for example, a value of "1") or if it includes the bit value that indicates that the current new section extension and current C-plane message are not intended for the current RU (for example, a value of "0").

If the RU mask indicates that the current new section extension 600 and the current C-plane message are intended for the current RU, the current RU uses the current C-plane message for the C-plane processing performed for that time slot (block 1206), identifies U-plane messages that correspond to the current new section extension 600 (and the current C-plane message) using the SectionID for the current new section extension 600 (block 1208), and uses the corresponding U-plane messages for the U-plane processing performed for that time slot (block 1210).

FIG. 12B comprises a high-level flowchart illustrating one exemplary embodiment of a method 1250 of receiving and processing downlink C-plane and U-plane messages that include new section extensions. The embodiment of method 1250 shown in FIG. 12B is suitable for use with the approach described in connection with FIGS. 8-10.

The embodiment of method 1250 shown in FIG. 12B is described here as being implemented in an O-RAN system of the type described above in which a DU is paired with multiple RUs to serve a single cell (though it is to be understood that other embodiments can be implemented in other ways). More specifically, the processing of method 1250 is described here as being performed by each RU.

The blocks of the flow diagram shown in FIG. 12B have been arranged in a generally sequential manner for ease of explanation; however, it is to be understood that this arrangement is merely exemplary, and it should be recognized that the processing associated with method 1250 (and the blocks shown in FIG. 12B) can occur in a different order (for example, where at least some of the processing associated with the blocks is performed in parallel and/or in an event-driven manner). Also, most standard exception handling is not described for ease of explanation; however, it is to be understood that method 1250 can and typically would include such exception handling.

Method 1250 is performed by each RU for each downlink C-plane or U-plane message that is broadcast by the DU for each slot that includes a new section extension 600 using the approach described above in connection with FIGS. 8-10.

In the following description, the particular RU and downlink C-plane or U-plane message that method 1250 is described below in connection with are referred to here as the "current" RU and "current" downlink C-plane or U-plane message, respectively.

Method 1250 comprises identifying the RU mask stored in the common header fields 810 of the current message (block 1252). That is, the current RU receives and decodes the current C-plane or U-plane message and parses the common header fields 810 in order to confirm that the payload version stored in the payload version field 840 is appropriate and in order to identify the RU mask stored in the RU mask field 808.

Method 1250 further comprises determining if the RU mask indicates that the current C-plane or U-plane message and all new section extensions 600 included in the current C-plane or U-plane message are intended for the current RU (block 1254). More specifically, the bit position in the RU mask that corresponds to the current RU is checked to see if it includes the bit value that indicates that the current C-plane or U-plane message and all new section extensions 600 included in the current C-plane or U-plane message are intended for the current RU (for example, a value of "1") or if it includes the bit value that indicates that the current C-plane or U-plane message and all new section extensions 600 included in the current C-plane or U-plane message are not intended for the current RU (for example, a value of "0").

If the RU mask indicates that the current C-plane or U-plane message and all new section extensions 600 included in the current C-plane or U-plane message are intended for the current RU, the current RU uses the current C-plane or U-plane message for the processing performed for that time slot (block 1256). Otherwise, If the RU mask indicates that the current C-plane or U-plane message and all new section extensions 600 included in the current C-plane or U-plane message are not intended for the current RU, the current RU discards the current C-plane or U-plane message and does not use them for any processing performed for that time slot (block 1258).

The new section extension 600 and methods 1100, 1200, and 1250 of FIGS. 11, 12A, and 12B can be used to send different sets of data to different RUs (to support wireless transmission therefrom). This can be used to enable frequency reuse in a RAN in which a DU is paired with multiple RUs to serve a single cell. Even when frequency reuse is not used in such a multi-RU RAN, the new section extension 600 and methods 1100, 1200, and 1250 of FIGS. 11, 12A, and 12B can be used to wirelessly transmit to a UE using less than all of the RUs. Moreover, it is to be understood that the new section extension 600 and methods 1100, 1200, and 1250 of FIGS. 11, 12A, and 12B can also be used to send the same data to all of the RUs. This can be used to enable "full simulcast" in such a multi-RU RAN, where all of the RUs wirelessly transmit the same data.

FIG. 13 illustrates one exemplary use case for the new section extension 600 described above where the approach described above in connection with FIGS. 5-7 is used. In the example shown in FIG. 13, the DU is paired with four RUs (RU #1, RU #2, RU #3, and RU #4) to serve a single cell that is used by two UEs (UE #1 and UE #2).

In this example, UE #1 is served by RU #1 and RU #2 and UE #2 is served by RU #3 and RU #4. Because of this, the scheduler in the DU determines that downlink frequency reuse can be used with UE #1 and UE #2 and all PRBs are allocated to both UE #1 and UE #2, where the downlink data transmitted to UE #1 from RU #1 and RU #2 during those reused PRBs differs from the downlink data transmitted to UE #2 from RU #3 and RU #4 during those reusedPRBs.

Using the techniques described above, the DU generates and broadcasts two downlink C-plane messages with the new section extension described above. A first downlink C-plane message includes a SectionID of #xy1 stored in the field SectionID field 516 and a RU mask of "1100" in the RU mask field 608 of the section extension 600. The first downlink C-plane message is intended for RU #1 and RU #2 (corresponding to the first and second bit positions, respectively, in the bit mask stored in the RU mask field 608) and is used for communicating with UE #1.

The second downlink C-plane message includes a SectionID of #xy2 stored in the field SectionID field 516 and a RU mask of "0011" in the RU mask field 608 of the new section extension 600. The second downlink C-plane message is intended for RU #3 and RU #4 (corresponding to the third and fourth bit positions, respectively, in the bit mask stored in the RU mask field 608) and is used for communicating with UE #2.

Using the techniques described above, the DU generates and broadcasts two corresponding downlink U-plane messages with the new section extension. A first downlink U-plane message includes a SectionID of #xy1 stored in the SectionID field 516 and RE data for UE #1. The second downlink U-plane message includes a SectionID of #xy2 stored in the SectionID field 516 and RE data for UE #2.

The DU transmits both of the C-plane messages and both of the U-plane messages to the switch, which then broadcasts the messages to all of the RUs.

When RU #1 and RU #2 receive and decode the first downlink C-plane message, they will determine that the first C-plane message is intended for them because there is a value of "1" stored in the first and second bit positions of the RU mask stored in the RU mask field 608 (which correspond to RU #1 and RU #2, respectively). In response to that determination, when RU #1 and RU #2 receive and decode the first downlink U-plane message, they will determine that the SectionID of #xy1 stored in the SectionID field 516 of the first downlink U-plane message matches the SectionID of #xy1 stored in the SectionID field 516 of the first downlink C-plane message and, as a result, will use the RE data stored in the first U-plane message as specified in the first C-plane message.

When RU #1 and RU #2 receive and decode the second downlink C-plane message, they will determine that the second C-plane message is not intended for them because there is a value of "0" stored in the first and second bit positions of the RU mask stored in the RU mask field 608 (which correspond to RU #1 and RU #2, respectively). In response to that determination, when RU #1 and RU #2 receive and decode the second downlink U-plane message, they will determine that the SectionID of #xy2 stored in the SectionID field 516 of the second downlink U-plane message matches the SectionID of #xy2 stored in the SectionID field 516 of the second downlink C-plane message and, as a result, will discard the second C-plane and U-plane messages.

When RU #3 and RU #4 receive and decode the first downlink C-plane message, they will determine that the second C-plane message is not intended for them because there is a value of "0" stored in the third and fourth bit positions of the RU mask stored in the RU mask field 608 (which correspond to RU #3 and RU #4, respectively). In response to that determination, when RU #3 and RU #4 receive and decode the first downlink U-plane message, they will determine that the SectionID of #xy1 stored in the SectionID field 516 of the first downlink U-plane message matches the SectionID of #xy1 stored in the SectionID field 516 of the first downlink C-plane message and, as a result, will discard the first C-plane and U-plane messages.

When RU #3 and RU #4 receive and decode the second downlink C-plane message, they will determine that the second C-plane message is intended for them because there is a value of "1" stored in the third and fourth bit positions of the RU mask stored in the RU mask field 608 (which correspond to RU #3 and RU #4, respectively). In response to that determination, when RU #3 and RU #4 receive and decode the second downlink U-plane message, they will determine that the SectionID of #xy2 stored in the SectionID field 516 of the second downlink U-plane message matches the SectionID of #xy2 stored in the SectionID field 516 of the second downlink C-plane message and, as a result, will use the RE data stored in the second U-plane message as specified in the second C-plane message.

FIG. 14 illustrates another exemplary use case for the new section extension 600 described above where the approach described above in connection with FIGS. 5-7 is used. The example shown in FIG. 14 is similar to the use case shown in FIG. 13 except that there is a third UE (UE #3) that is served by RU #2 and RU #3.

As with the use case described above in connection with FIG. 13, the scheduler in the DU determines that downlink frequency reuse can be used with UE #1 and UE #2 and all PRBs are allocated to both UE #1 and UE #2. However, because UE #3 is served by RU #2 (which is included in the subset of RUs serving UE #1) and RU #3 (which is included in the subset of RUs serving UE #2), the DU cannot place UE #3 into reuse with UE #1 or UE #2 and instead must make a separate PRB allocation for UE #3. In this use case, a third C-plane message and third U-plane message intended for RU #2 and RU #3 are generated and communicated to all of the RUs. RU #2 and RU #3 will determine that these third C-plane and U-plane messages are intended for them and will use the RE data stored in the third U-plane message as specified in the third C-plane message to communicate with UE #3. Likewise, the RU #1 and RU #4 will determine that these third C-plane and U-plane messages are not intended for them and will discard the third C-plane and U-plane messages.

As noted above, in the examples shown in FIGS. 13 and 14, the approach described above in connection with FIGS. 5-7 is used. With this approach, the RU mask field 608 is communicated in the section extension 600 of the C-plane message, and the U-plane messages corresponding to that section extension 600 are determined based on the SectionID stored in the SectionID field 516 of C-plane and U-plane messages. However, if the approach described above in connection with FIGS. 8-10 were used, the determination as to whether a particular C-plane or U-plane message is intended for each RU can be made based on the RU mask field 808 included in the common header fields 810 of the application layer data of each C-plane message and U-plane message.

The description set forth above focuses primarily on the user-plane and control-plane aspects of implementing a switched network (SN) shared cell configuration. Management-plane (M-plane) aspects of implementing a SN shared cell configuration are described below in connection with FIGS. 15-17.

As noted above, M-plane messages comprise messages that pertain to the instantiation, configuration and management of each DU and RU. M-plane messages are communicated infrequently, typically during initial configuration and bring-up and during system reconfigurations. FIG. 15 is a high-level block diagram illustrating one exemplary embodiment of M-plane functionally used in an O-RAN system that can be used to implement a SN shared cell configuration. As with the embodiment described above in connection with FIG. 5A, a single DU 1502 is paired with multiple RUs 1504, and the DU 1502 and RUs 1504 communicate with each other over a fronthaul 1506 that is implemented using a switched Ethernet network 1508.

Each DU 1502 and RU 1504 implements M-plane functionality 1510 that is used to facilitate the instantiation, initialization, configuration, and management of the respective DU 1502 or RU 1504 (including the control-plane and user-plane (CU-plane) functionality 1512 and synchronization-plane (S-plane) functionality 1514 included therein) to support the particular functional split used for communicating over the fronthaul 1506. M-plane messages can also be communicated to and from a management system 1516 in connection with carrying out M-plane functions.

The M-plane functionality 1510 in the DU 1502 configures the CU-plane functionality 1512 each DU 1502 and RU 1504. As a part of doing this, the M-plane functionality 1510 uses an O-RAN user-plane configuration module specified in the O-RAN Alliance Working Group 4 Management Plane Specification (O-RAN.WG4.MP.0-v04.00 Technical Specification).

A portion of an O-RAN user-plane configuration module 1600 is shown in FIG. 16. The module 1600 is implemented as a Yang data module. As a part of the user-plane configuration performed by the DU 1502, one or more logical low level transmit (TX) links ("low-level-tx-links") 1602 are defined. Each low level TX link 1602 is given a respective name 1604 and associates a respective processing element ("processing-element") 1606, TX array carrier ("tx-array-carrier") 1608, and low level TX endpoint ("low-level-tx-endpoint") 1610 with each other.

Conventionally, the processing element 1606 defines a logical entity (and associated parameters) that specifies, among other things, a transport flow between an interface in the DU 1502 and an interface in a single RU 1504 for use by the CU-plane functionality 1512. The DU interface specified for the transport flow defined by the processing element 1606 provides access to an appropriate endpoint in the DU 1502, and the RU interface specified by the processing element 1606 provides access to an appropriate endpoint in that single RU 1504. The TX array carrier 1608 defines parameters for the RF carrier associated with the low level TX link 1602. The low level TX endpoint 1610 defines parameters for various resources in the RU 1504 that are used to serve the RF carrier associated with the low level TX link 1602. For example, the low level TX endpoint 1610 defines a mapping to a particular antenna port and associated TX array of the RU 1504. Each of these items is explained further in the O-RAN Alliance Working Group 4 Management Plane Specification.

As noted above, conventionally, the processing element 1606 included in each logical low level transmit TX link 1602 specifies a transport flow between an interface in the DU 1502 and an interface in a single RU 1504. Conventionally, the transport flow specified in a processing element 1606 can be specified as one of three types of transport flows. The first type of transport flow is referred to as an alias media access control (MAC) transport flow. For an alias MAC transport flow, an RU interface is specified for the transport flow as a single unicast alias MAC address that is associated with a single RU 1504. Also, for an alias MAC transport flow, a DU interface is specified for the transport flow as a MAC address for the DU 1502.

The second type of transport flow is referred to as an Ethernet transport flow. For an Ethernet transport flow, an RU interface is specified for the transport flow as a combination of a virtual LAN (VLAN) identifier and a single unicast MAC address that is associated with a single RU 1504. Also, for an Ethernet transport flow, a DU interface is specified for the transport flow as a MAC address for the DU 1502. The third way type of transport flow is referred to as a User Datagram Protocol (UDP) IP transport flow. For a UDP IP transport flow, an RU interface is specified for the transport flow as a combination of a UDP port and a single unicast IP address that is associated with a single RU 1504. Also, for a UDP IP transport flow, a DU interface is specified for the transport flow as an IP address for the DU 1502.

However, an RU interface that specifies only a single unicast address associated with a single RU 1504 is not suitable for use with the switched network shared cell configuration described above, where each downlink transport flow can be communicated from the DU 1502 to multiple RUs 1504 and where each RU 1504 can be associated with multiple multicast addresses.

Therefore, to address this issue, the O-RAN Alliance Working Group 4 Management Plane Specification can be updated to enable the transport flow of each processing element to be specified using an RU interface that is either a single unicast address associated with a single RU 1504 or one or more multicast addresses. Each of the specified multicast addresses is associated with multiple RUs 1504 and provides access to an appropriate endpoint in each of the RUs 1504 associated with each multicast address.

In one embodiment, if the transport flow specified in a processing element 1606 is specified as an alias MAC transport flow, then either a single unicast MAC address or one or more multicast MAC addresses can be specified for the alias MAC address used for the RU interface. The way that an alias MAC address is defined already enables multiple MAC addresses to be specified; however, the definition of a processing element in the O-RAN Alliance Working Group 4 Management Plane Specification requires the alias MAC address used for the RU interface to specify only a single unicast MAC address associated with a single RU 1504. To address this, the definition of a processing element in the O-RAN Alliance Working Group 4 Management Plane Specification can be changed to permit an alias MAC address that specifies either a single unicast MAC address associated or one or more multicast MAC addresses to be used as the RU interface when specifying an alias MAC transport flow for a processing element.

In such an embodiment, if the transport flow specified in a processing element 1606 is specified as an Ethernet transport flow, then either a single unicast MAC address associated with a single RU 1504 or one or more multicast MAC addresses (where each multicast MAC address is associated with multiple RUs 1504) can be specified for the MAC address used for the RU interface. This can be done by changing the O-RAN Alliance Working Group 4 Management Plane Specification to enable the RU interface for an Ethernet transport flow to specify an array of one or more MAC addresses, where each MAC address can either be a unicast MAC address associated with a single RU 1504 or a multicast MAC address associated with multiple RUs 1504.

In such an embodiment, the O-RAN Alliance Working Group 4 Management Plane Specification can be updated to define new types of transport flows that can be used to specify the transport flow of a processing element. One new type of transport flow, referred to as a multicast Ethernet transport flow, specifies an RU interface as a combination of a VLAN identifier and one or more multicast MAC addresses and specifies a DU interface as a MAC address for the DU 1502. Each of the specified multicast MAC addresses is associated with multiple RUs 1504 and provides access to an appropriate endpoint in each of the RUs 1504 associated with each multicast MAC address. The multicast Ethernet transport flow is otherwise the same as the unicast Ethernet transport flow.

Another new type of transport flow, referred to as a multicast UDP IP transport flow, specifies an RU interface as a combination of a UDP port and one or more multicast IP addresses and specifies a DU interface as an IP address for the DU 1502. Each of the specified multicast IP addresses is associated with multiple RUs 1504 and provides access to an appropriate endpoint in each of the RUs 1504 associated with each multicast IP address. The multicast UDP IP transport flow is otherwise the same as the unicast UDP IP transport flow.

By updating the O-RAN Alliance Working Group 4 Management Plane Specification to enable the transport flow of each processing element to be specified using an RU interface that is either a single unicast address associated with a single RU 1504 or one or more multicast addresses, transport flows and processing elements suitable for use with the switched network shared cell configuration described above can be defined, instantiated, initialized, configured, and managed by the M-plane functionality 1510 and management system 1516.

The M-plane functionality 1510 in the DU 1502 and RUs 1504 implement an RU discovery process in which each RU 1504 advertises its capabilities so that other entities can discover those capabilities. This process is defined in the O-RAN Alliance Working Group 4 Management Plane Specification. However, conventionally, this capability discovery process does not involve advertising some capabilities associated with implementing the switched network shared cell configuration described above. In order to address this issue, the M-plane functionality 1510 in each RU 1504 can be configured so that it advertises, during the capability discovery process, that it is capable of processing the new payload version described above if it is capable of doing so and that it is capable of handling the new transport flow types described above (that is, the multicast Ethernet transport flow and the multicast UDP IP transport flow) if it is capable of doing so.

Moreover, as noted above, with the switched network shared cell configuration described above, each RU 1504 must check the RU mask included in the header of C-plane and U-plane packets that use the new payload version described above. The packets are checked in order to determine if the packet is intended for that RU 1504 and to process the packet further if it is intended for it and to discard the packet if it is not intended for it. Doing this RU mask inspection imposes an additional processing load on the RU 1504. A relevant parameter can be defined for each RU 1504 that is capable of processing the new payload version described above. This parameter is indicative of the maximum number of packets that the associated RU 1504 can discard in connection with this RU mask inspection processing during a given period (for example, during a slot). This parameter is also referred to here as the "maximum discardable packet parameter."

The M-plane functionality 1510 in each RU 1504 that is capable of processing the new payload version described above can also be configured so that it advertises, during the capability discovery process, the maximum discardable packet parameter for the RU 1504. The DU 1502 can then use the maximum discardable packet parameter to ensure that the RU 1504 does not receive, during the associated time period, more discardable packets that it can process as indicated by the maximum discardable packet parameter for the RU 1504.

FIG. 17 comprises a high-level flowchart illustrating one exemplary embodiment of a method 1700 of configuring an RU for use in implementing the switched network shared cell configuration described above.

The embodiment of method 1700 shown in FIG. 17 is described here as being implemented in an O-RAN system of the type described above in which a DU is paired with multiple RUs to serve a single cell (though it is to be understood that other embodiments can be implemented in other ways).

The blocks of the flow diagram shown in FIG. 17 have been arranged in a generally sequential manner for ease of explanation; however, it is to be understood that this arrangement is merely exemplary, and it should be recognized that the processing associated with method 1700 (and the blocks shown in FIG. 17) can occur in a different order (for example, where at least some of the processing associated with the blocks is performed in parallel and/or in an event-driven manner). Also, most standard exception handling is not described for ease of explanation; however, it is to be understood that method 1700 can and typically would include such exception handling.

Method 1700 includes, during the capability discovery process, advertising, by each RU 1504, its capabilities related to implementing a switched network shared cell configuration (block 1702). This is done by the M-plane functionality 1510. As a part of doing this, each RU 1504 advertises that it is capable of processing the new payload version described above if it is capable of doing so and that it is capable of handling the new transport flow types described above (that is, the multicast Ethernet transport flow and the multicast UDP IP transport flow) if it is capable of doing so. Also, each RU 1504 that is capable of processing the new payload version described above advertises the maximum discardable packet parameter for the RU 1504.

Method 1700 includes configuring the CU-plane functionality 1512 in the DU 1502 and the RUs 1504 in order to implement a switched network shared cell configuration (block 1704). This is done by the M-plane functionality 1510. As a part of doing this, the DU 1502 configures the transport flow for one or more processing elements using an RU interface that specifies one or more multicast addresses in order to support the multicast transmission techniques described above. Also, the DU 1502 is configured to ensure that each RU 1504 does not receive, during the associated time period, more discardable packets that it can process as indicated by the maximum discardable packet parameter for the RU 1504.

FIG. 18 is a block diagram illustrating one exemplary embodiment of a radio access network (RAN) system 1800 in which the new section extension 600 and methods 1100 and 1200 described above can be used. Also, the management-plane techniques described above in connection with FIGS. 15-18 can be used. The RAN system 1800 shown in FIG. 18 implements a base station. The RAN system 1800 can also be referred to here as a "base station" or "base station system."

In the exemplary embodiment shown in FIG. 18, the system 1800 is implemented at least in part using a centralized or cloud RAN (C-RAN) architecture that employs, for each cell (or sector) 1802 served by the system 1800, at least one distributed unit (DU) 1804 and multiple remote units (RUs) 1806. The system 1800 is also referred to here as a "C-RAN system" 1800. Each RU 1806 is remotely located from each DU 1804 serving it. Also, in this exemplary embodiment, at least one of the RUs 1806 is remotely located from at least one other RU 1806 serving that cell 1802.

The RAN system 1800 can be implemented in accordance with one or more public standards and specifications. For example, the RAN system 1800 can be implemented using a RAN architecture and/or RAN fronthaul interfaces defined by the O-RAN Alliance. In such an O-RAN example, the DU 1804 and RUs 1806 can be implemented as O-RAN distributed units (DUs) and O-RAN remote units (RUs), respectively, in accordance with the O-RAN specifications. More specifically, the DU 1804 and RUs 1806 are configured to use the ORAN fronthaul specification in combination with the new section extension 600 and methods 1100 and 1200 described above.

Each RU 1806 includes or is coupled to one or more antennas 1808 via which downlink RF signals are radiated to various items of user equipment (UE) 1810 and via which uplink RF signals transmitted by UEs 1810 are received.

The system 1800 is coupled to a core network 1812 of the associated wireless network operator over an appropriate backhaul 1814 (such as the Internet). Also, each DU 1804 is communicatively coupled to the RUs 1806 served by it using a fronthaul 1816. Each of the DU 1804 and RUs 1806 include one or more network interfaces (not shown) in order to enable the DU 1804 and RUs 1806 to communicate over the fronthaul 1816.

In one implementation, the fronthaul 1816 that communicatively couples the DU 1804 to the RUs 1806 is implemented using a switched ETHERNET network 1818. In such an implementation, each DU 1804 and RUs 1806 includes one or more ETHERNET interfaces for communicating over the switched ETHERNET network 1818 used for the fronthaul 1816. However, it is to be understood that the fronthaul between each DU 1804 and the RUs 1806 served by it can be implemented in other ways.

Generally, for each cell 1802 implemented by the RAN system 1800, each DU 1804 serving the cell 1802 performs the LAYER-3 and LAYER-2 functions for the particular wireless interface used for that cell 1802. Also, for each cell 1802 implemented by the RAN system 1800, each corresponding DU 1804 serving the cell 1802 performs some of the LAYER-1 functions for the particular wireless interface used for that cell 1802. Each of the RUs 1806 serving that cell 1802 perform the LAYER-1 functions not performed by the DU 1804 as well as implementing the basic RF and antenna functions.

Each DU 1804 and RU 1806 (and the functionality described as being included therein), as well as the system 1800 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components. Each DU 1804, RU 1806, and the system 1800 more generally, can be implemented in other ways.

Other embodiments can be implemented in other ways.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a system comprising: a distributed unit (DU) to communicatively couple to a core network, the DU configured to implement at least some LAYER 2 functions for a wireless interface and at least some LAYER 1 functions for the wireless interface; a plurality of remote units (RUs) to wirelessly transmit and receive radio frequency signals to and from the user equipment using the wireless interface, each of the RUs associated with at least one antenna and located remote from the DU and at least one other RU, wherein each RU is configured to implement the LAYER 1 functions for the wireless interface that are not implemented in the DU; wherein the DU and RUs are communicatively coupled to each other over a fronthaul and are configured to communicate over the fronthaul using an O-RAN fronthaul interface; and wherein management-plane functionality in the system is configured to define a respective transport flow for one or more processing elements using an RU interface that specifies one or more multicast addresses in order to support multicast transmission from the DU to multiple RUs.

Example 2 includes the system of Example 1, wherein management-plane functionality in the system is configured to define one or more of the following: an alias MAC transport flow for a processing element using an RU interface specified using either a single unicast MAC address or one or more multicast MAC addresses; an Ethernet transport flow for a processing element using an RU interface specified using either a single unicast MAC address or one or more multicast MAC addresses; a multicast Ethernet transport flow for a processing element using an RU interface specified using one or more multicast MAC addresses; and a multicast UDP IP transport flow for a processing element using an RU interface specified using one or more multicast IP addresses Example 3 includes the system of any of the Examples 1-2, wherein the DU and RUs are configured to use a RU mask field included in a packet comprising O-RAN control-plane or user-plane data, wherein the RU mask indicates for each RU if the packet is intended for that RU and where each RU is configured to discard any packet that is not intended for that RU.

Example 4 includes the system of Example 3, wherein each RU has an associated parameter indicative of a maximum number of packets that the RU can discard during a given time period.

Example 5 includes the system of Example 4, wherein the management-plane functionality configures the DU to ensure that each RU does not receive, during the given time period, more discardable packets that the RU can process as indicated by the associated parameter for the RU.

Example 6 includes the system of any of the Examples 4-5, wherein the given time period for the associated parameter for each RU comprises a slot.

Example 7 includes the system of any of the Examples 1-6, wherein each RU is configured to, during the capability discovery process, advertise capabilities related to implementing a switched network shared cell configuration.

Example 8 includes the system of Example 7, wherein the DU and RUs are configured to communicate O-RAN control-plane and user-plane packets that include a new O-RAN section extension for use in communicating different section data to different RUs; and wherein, during the capability discovery process, each RU is configured to advertise if the RU is able to process O-RAN control-plane and user-plane packets that include the new O-RAN section extension.

Example 9 includes the system of Example 8, wherein, during the capability discovery process, each RU is configured to advertise an associated maximum discardable packet parameter indicative of a maximum number of packets that the RU can discard during a given time period.

Example 10 includes the system of any of the Examples 7-9, wherein, during the capability discovery process, each RU is configured to advertise that the RU is capable of handling multicast transport flows.

Example 11 includes a system comprising: a distributed unit (DU) to communicatively couple to a core network, the DU configured to implement at least some LAYER 2 functions for a wireless interface and at least some LAYER 1 functions for the wireless interface; a plurality of remote units (RUs) to wirelessly transmit and receive radio frequency signals to and from the user equipment using the wireless interface, each of the RUs associated with at least one antenna and located remote from the DU and at least one other RU, wherein each RU is configured to implement the LAYER 1 functions for the wireless interface that are not implemented in the DU; wherein the DU and RUs are communicatively coupled to each other over a fronthaul and are configured to communicate over the fronthaul using an O-RAN fronthaul interface; and wherein each RU is configured to advertise, during a capability discovery process, capabilities related to implementing a switched network shared cell configuration.

Example 12 includes the system of Example 11, wherein the DU and RUs are configured to communicate O-RAN control-plane and user-plane packets that include a new O-RAN section extension for use in communicating different section data to different RUs; and wherein each RU is configured to advertise, during the capability discovery process, if the RU is able to process O-RAN control-plane and user-plane packets that include the new O-RAN section extension.

Example 13 includes the system of Example 12, wherein each RU is configured to advertise, during the capability discovery process, an associated maximum discardable packet parameter indicative of a maximum number of packets that the RU can discard during a given time period.

Example 14 includes the system of any of the Examples 11-13, wherein each RU is configured to advertise, during the capability discovery process, that the RU is capable of handling multicast transport flows.

Example 15 includes the system of any of the Examples 11-14, wherein management-plane functionality in the system is configured to define a respective transport flow for one or more processing elements using an RU interface that specifies one or more multicast addresses in order to support multicast transmission from the DU to multiple RUs.

Example 16 includes the system of Example 15, wherein management-plane functionality in the system is configured to define one or more of the following: an alias MAC transport flow for a processing element using an RU interface specified using either a single unicast MAC address or one or more multicast MAC addresses; an Ethernet transport flow for a processing element using an RU interface specified using either a single unicast MAC address or one or more multicast MAC addresses; a multicast Ethernet transport flow for a processing element using an RU interface specified using one or more multicast MAC addresses; and a multicast UDP IP transport flow for a processing element using an RU interface specified using one or more multicast IP addresses Example 17 includes the system of any of the Examples 15-16, wherein the DU and RUs are configured to use a RU mask field included in a packet comprising O-RAN control-plane or user-plane data, wherein the RU mask indicates for each RU if the packet is intended for that RU and where each RU is configured to discard any packet that is not intended for that RU.

Example 18 includes the system of Example 17, wherein each RU has an associated parameter indicative of a maximum number of packets that the RU can discard during a given time period.

Example 19 includes the system of Example 18, wherein the management-plane functionality configures the DU to ensure that each RU does not receive, during the given time period, more discardable packets that the RU can process as indicated by the associated parameter for the RU.

Example 20 includes the system of any of the Examples 18-19, wherein the given time period for the associated parameter for each RU comprises a slot.

What is claimed is:

1. A system comprising:
    a distributed unit (DU) configured to implement at least some LAYER 2 functions for a wireless interface and at least some LAYER 1 functions for the wireless interface; and
    a plurality of remote units (RUs) to wirelessly transmit and receive radio frequency signals to and from user equipment using the wireless interface, each of the RUs associated with at least one antenna and located remote from the DU and at least one other RU, wherein each RU is configured to implement at least some LAYER 1 functions for the wireless interface;
    wherein the DU and RUs are communicatively coupled to each other over a fronthaul and are configured to communicate over the fronthaul using an O-RAN fronthaul interface; and
    wherein management-plane functionality in the system is configured to define a respective transport flow for one or more processing elements using an RU interface that specifies one or more multicast addresses in order to support multicast transmission from the DU to multiple RUs.

2. The system of claim 1, wherein management-plane functionality in the system is configured to define one or more of the following:
    an alias MAC transport flow for a processing element using an RU interface specified using either a single unicast MAC address or one or more multicast MAC addresses;
    an Ethernet transport flow for a processing element using an RU interface specified using either a single unicast MAC address or one or more multicast MAC addresses;
    a multicast Ethernet transport flow for a processing element using an RU interface specified using one or more multicast MAC addresses; and
    a multicast UDP IP transport flow for a processing element using an RU interface specified using one or more multicast IP addresses.

3. The system of claim 1, wherein the DU and RUs are configured to use a RU mask field included in a packet comprising O-RAN control-plane or user-plane data, wherein the RU mask indicates for each RU if the packet is intended for that RU and where each RU is configured to discard any packet that is not intended for that RU.

4. The system of claim 3, wherein each RU has an associated parameter indicative of a maximum number of packets that the RU can discard during a given time period.

5. The system of claim 4, wherein the management-plane functionality configures the DU to ensure that each RU does not receive, during the given time period, more discardable packets that the RU can process as indicated by the associated parameter for the RU.

6. The system of claim 4, wherein the given time period for the associated parameter for each RU comprises a slot.

7. The system of claim 1, wherein each RU is configured to, during the capability discovery process, advertise capabilities related to implementing a switched network shared cell configuration.

8. The system of claim 7, wherein the DU and RUs are configured to communicate ORAN control-plane and user-plane packets that include a new O-RAN section extension for use in communicating different section data to different RUs; and
    wherein, during the capability discovery process, each RU is configured to advertise if the RU is able to process O-RAN control-plane and user-plane packets that include the new O-RAN section extension.

9. The system of claim 8, wherein, during the capability discovery process, each RU is configured to advertise an associated maximum discardable packet parameter indicative of a maximum number of packets that the RU can discard during a given time period.

10. The system of claim 7, wherein, during the capability discovery process, each RU is configured to advertise that the RU is capable of handling multicast transport flows.

11. A system comprising:
a distributed unit (DU) configured to implement at least some LAYER 2 functions for a wireless interface and at least some LAYER 1 functions for the wireless interface; and
a plurality of remote units (RUs) to wirelessly transmit and receive radio frequency signals to and from user equipment using the wireless interface, each of the RUs associated with at least one antenna and located remote from the DU and at least one other RU, wherein each RU is configured to implement at least some LAYER 1 functions for the wireless interface;
wherein the DU and RUs are communicatively coupled to each other over a fronthaul and are configured to communicate over the fronthaul using an O-RAN fronthaul interface; and
wherein each RU is configured to advertise, during a capability discovery process, capabilities related to implementing a switched network shared cell configuration.

12. The system of claim 11, wherein the DU and RUs are configured to communicate ORAN control-plane and user-plane packets that include a new O-RAN section extension for use in communicating different section data to different RUs; and
wherein each RU is configured to advertise, during the capability discovery process, if the RU is able to process O-RAN control-plane and user-plane packets that include the new O-RAN section extension.

13. The system of claim 12, wherein each RU is configured to advertise, during the capability discovery process, an associated maximum discardable packet parameter indicative of a maximum number of packets that the RU can discard during a given time period.

14. The system of claim 11, wherein each RU is configured to advertise, during the capability discovery process, that the RU is capable of handling multicast transport flows.

15. The system of claim 11, wherein management-plane functionality in the system is configured to define a respective transport flow for one or more processing elements using an RU interface that specifies one or more multicast addresses in order to support multicast transmission from the DU to multiple RUs.

16. The system of claim 15, wherein management-plane functionality in the system is configured to define one or more of the following:
an alias MAC transport flow for a processing element using an RU interface specified using either a single unicast MAC address or one or more multicast MAC addresses;
an Ethernet transport flow for a processing element using an RU interface specified using either a single unicast MAC address or one or more multicast MAC addresses;
a multicast Ethernet transport flow for a processing element using an RU interface specified using one or more multicast MAC addresses; and
a multicast UDP IP transport flow for a processing element using an RU interface specified using one or more multicast IP addresses.

17. The system of claim 15, wherein the DU and RUs are configured to use a RU mask field included in a packet comprising O-RAN control-plane or user-plane data, wherein the RU mask indicates for each RU if the packet is intended for that RU and where each RU is configured to discard any packet that is not intended for that RU.

18. The system of claim 17, wherein each RU has an associated parameter indicative of a maximum number of packets that the RU can discard during a given time period.

19. The system of claim 18, wherein the management-plane functionality configures the DU to ensure that each RU does not receive, during the given time period, more discardable packets that the RU can process as indicated by the associated parameter for the RU.

20. The system of claim 18, wherein the given time period for the parameter for each RU comprises a slot.

21. A remote unit (RU) configured for use with a system comprising a distributed unit (DU) configured to implement at least some LAYER 2 functions for a wireless interface and at least some LAYER 1 functions for the wireless interface and a plurality of RUs to wirelessly transmit and receive radio frequency signals to and from user equipment using the wireless interface, wherein the RU is located remote from the DU and at least one other of the plurality of RUs, the RU comprising:
an antenna interface to couple the RU to at least one antenna;
a network interface to communicatively couple the RU to the DU and the other RUs included in the plurality of RUs over a fronthaul; and
circuitry configured to:
communicate over the fronthaul using an O-RAN fronthaul interface;
implement at least some LAYER 1 functions for the wireless interface; and
advertise, during a capability discovery process, capabilities related to implementing a switched network shared cell configuration.

22. The RU of claim 21, wherein the DU and each of the plurality of RUs are configured to communicate ORAN control-plane and user-plane packets that include a new O-RAN section extension for use in communicating different section data to different RUs; and
wherein the RU is configured to advertise, during the capability discovery process, if the RU is able to process O-RAN control-plane and user-plane packets that include the new O-RAN section extension.

23. The RU of claim 22, wherein the RU is configured to advertise, during the capability discovery process, an associated maximum discardable packet parameter indicative of a maximum number of packets that the RU can discard during a given time period.

24. The RU of claim 21, wherein the RU is configured to advertise, during the capability discovery process, that the RU is capable of handling multicast transport flows.

25. The RU of claim 21, wherein management-plane functionality in the system is configured to define a respective transport flow for one or more processing elements using an RU interface that specifies one or more multicast addresses in order to support multicast transmission from the DU to multiple RUs.

26. The RU of claim 25, wherein management-plane functionality in the system is configured to define one or more of the following:
an alias MAC transport flow for a processing element using an RU interface specified using either a single unicast MAC address or one or more multicast MAC addresses;

an Ethernet transport flow for a processing element using an RU interface specified using either a single unicast MAC address or one or more multicast MAC addresses;

a multicast Ethernet transport flow for a processing element using an RU interface specified using one or more multicast MAC addresses; and a multicast UDP IP transport flow for a processing element using an RU interface specified using one or more multicast IP addresses.

27. The RU of claim 25, wherein the DU and each of the plurality of RUs are configured to use a RU mask field included in a packet comprising O-RAN control-plane or user-plane data, wherein the RU mask indicates for each of the plurality of RUs if the packet is intended for that RU and where each of the plurality of RUs is configured to discard any packet that is not intended for that RU.

28. The RU of claim 27, wherein each of the plurality of RUs has an associated parameter indicative of a maximum number of packets that the RU can discard during a given time period.

29. The RU of claim 28, wherein the management-plane functionality configures the DU to ensure that each of the plurality of RUs does not receive, during the given time period, more discardable packets that the RU can process as indicated by the associated parameter for the RU.

30. The RU of claim 28, wherein the given time period for the parameter for each of the plurality of RUs comprises a slot.

* * * * *